US012755597B2

(12) United States Patent
Dobbins et al.

(10) Patent No.: US 12,755,597 B2
(45) Date of Patent: Oct. 6, 2026

(54) DETECTING VENDING OF ITEMS FROM INVENTORY TRACKS OF ITEM DISPENSING SYSTEMS

(71) Applicant: Ellenby Technologies, Inc., Woodbury Heights, NJ (US)

(72) Inventors: Aaron H. Dobbins, Cherry Hill, NJ (US); Marcus M. Peñate, Absecon, NJ (US); Thomas J. Carullo, Sewell, NJ (US)

(73) Assignee: Ellenby Technologies, Inc., Woodbury Heights, NJ (US)

( * ) Notice: Subject to any disclaimer, the term of this patent is extended or adjusted under 35 U.S.C. 154(b) by 0 days.

(21) Appl. No.: 19/233,775

(22) Filed: Jun. 10, 2025

(65) Prior Publication Data

US 2025/0299525 A1 Sep. 25, 2025

Related U.S. Application Data

(63) Continuation of application No. 17/724,874, filed on Apr. 20, 2022, now Pat. No. 12,374,180.

(51) Int. Cl.

*G07D 11/40* (2019.01)
*B65G 1/06* (2006.01)

(Continued)

(52) U.S. Cl.

CPC ............... *G07D 11/40* (2019.01); *B65G 1/06* (2013.01); *G07D 1/00* (2013.01); *G07D 11/12* (2019.01);

(Continued)

(58) Field of Classification Search

CPC .......... G07D 11/40; G07D 1/00; G07D 11/12; G07D 11/225; G07D 11/237; G07D 11/34;

(Continued)

(56) References Cited

U.S. PATENT DOCUMENTS

| | | | |
|---|---|---|---|
| 5,927,539 | A | 7/1999 | Truitt et al. |
| 6,131,399 | A | 10/2000 | Hall |

(Continued)

FOREIGN PATENT DOCUMENTS

| | | | |
|---|---|---|---|
| CN | 107833361 | B | 3/2020 |
| GB | 2170792 | A | 8/1986 |

*Primary Examiner* — Sonji N Johnson
(74) *Attorney, Agent, or Firm* — Ryan, Mason & Lewis, LLP

(57) ABSTRACT

An item dispensing system includes one or more inventory drawers, at least one of the inventory drawers comprising one or more inventory tracks configured to hold items. At least a given one of the inventory tracks comprises a drive assembly comprising a motor and a sensor assembly affixed above a front of the given inventory track proximate an item drop region of the item dispensing system. The drive assembly is configured to controllably advance the items held in the given inventory track towards the item drop region, and the sensor assembly is configured to detect vending of items from the given inventory track to the item drop region using at least one light emitter and sensor. The item dispensing system also includes an item dispensing system controller configured to control the motor and monitor signals from the sensor to determine whether the given item has dispensed.

20 Claims, 19 Drawing Sheets

(51) Int. Cl.

| | |
|---|---|
| ***G07D 1/00*** | (2006.01) |
| ***G07D 11/12*** | (2019.01) |
| ***G07D 11/225*** | (2019.01) |
| ***G07D 11/237*** | (2019.01) |
| ***G07D 11/34*** | (2019.01) |

(52) U.S. Cl.
CPC ......... *G07D 11/225* (2019.01); *G07D 11/237* (2019.01); *G07D 11/34* (2019.01); *B65G 2203/0233* (2013.01); *G07D 2201/00* (2013.01)

(58) Field of Classification Search
CPC .................. G07D 2201/00; B65G 1/06; B65G 2203/0233
See application file for complete search history.

(56) References Cited

U.S. PATENT DOCUMENTS

| | | | | |
|---|---|---|---|---|
| 6,640,994 | B2 | 11/2003 | Chen | |
| 6,732,014 | B2 | 5/2004 | Whitten et al. | |
| 6,822,550 | B1 | 11/2004 | Sims et al. | |
| 6,975,922 | B2 * | 12/2005 | Duncan .................. | G07F 11/62 221/241 |
| 7,053,773 | B2 | 5/2006 | McGarry et al. | |
| 7,073,683 | B1 | 7/2006 | Quinnell et al. | |
| 7,446,302 | B2 | 11/2008 | Mason et al. | |
| 7,565,222 | B2 | 7/2009 | Popelka | |
| 8,046,100 | B2 | 10/2011 | Whitten et al. | |
| 8,234,007 | B2 | 7/2012 | Garson et al. | |
| 8,770,372 | B2 | 7/2014 | Dobbins et al. | |
| 8,905,579 | B2 | 12/2014 | Dobbins et al. | |
| 9,142,079 | B2 | 9/2015 | Dobbins et al. | |
| 9,593,811 | B2 | 3/2017 | Dobbins et al. | |
| 9,619,957 | B2 | 4/2017 | Dobbins et al. | |
| 9,816,673 | B2 | 11/2017 | Dobbins et al. | |
| 9,947,166 | B2 | 4/2018 | Dobbins et al. | |
| 10,055,928 | B1 | 8/2018 | Van Horn | |
| 10,803,434 | B2 | 10/2020 | Smith et al. | |
| 11,714,983 | B1 | 8/2023 | Imboden | |
| 2004/0059465 | A1 | 3/2004 | Nickerson et al. | |
| 2008/0109109 | A1 | 5/2008 | Schanin et al. | |
| 2010/0237091 | A1 * | 9/2010 | Garson .................. | G07F 11/16 221/226 |
| 2013/0200095 | A1 | 8/2013 | Dobbins et al. | |
| 2019/0156612 | A1 | 5/2019 | Dobbins et al. | |
| 2020/0275778 | A1 | 9/2020 | Marriott et al. | |
| 2020/0324974 | A1 | 10/2020 | Gorman | |

* cited by examiner

DETECTING VENDING OF ITEMS FROM INVENTORY TRACKS OF ITEM DISPENSING SYSTEMS

RELATED APPLICATION

The present application is a continuation of U.S. patent application Ser. No. 17/724,874, filed on Apr. 20, 2022 and entitled "Detecting Vending of Items from Inventory Tracks of Item Dispensing Systems," the disclosure of which is incorporated by reference herein.

FIELD

The field relates generally to item dispensing systems, and more particularly to management of items in item dispensing systems.

BACKGROUND

Product vend detection is a critical part of any modern vending machine. Sensors are arranged to detect that a product is vended to a customer with a high degree of confidence.

Mechanical methods, such as switches positioned under a pressure plate, have been used to detect the vending of heavier, regularly shaped objects such as beverages packaged in bottles and cans as described in U.S. Pat. No. 5,927,539. Similarly, piezo sensors, accelerometers, and microphones can be employed to detect product impact in the dispense area as described in UK Patent Application GB 2,170,792. These methods, however, suffer from vulnerability to a variety of cheats whereby the impact of the vended product is dampened with foam or other barriers. They also must be specially tuned for the size and weight of the products they aim to detect. An additional drawback is that mechanical detection schemes such as these are subject to degradation over time as they are repeatedly impacted by falling product, are subject to spills, dust and grime, etc., which may all reduce performance.

One of the most popular techniques used today to verify products successfully vend is using an arrangement of non-impacted sensors located just above the retrieval area of a vending machine that vended product must fall through, often under the influence of gravity. U.S. Pat. No. 6,732,014 describes the use of an optical light curtain that detects product passing through by strobing emitters on one side of the curtain and detecting the light with multiple receivers located on the opposing side. Similarly, U.S. Pat. No. 7,565,222 describes a light curtain arrangement whereby fewer emitters and receivers are used on opposing sides and light from each emitter is detected by all receivers. In analogous art, U.S. Pat. No. 7,446,302 describes that it is possible to build a curtain with one emitter and multiple receivers on opposing sides of a vending machine above the retrieval area.

The drawback of light curtain sensing schemes is that they can only capture one vended product at a time. If it is desirable to vend multiple products at once, the curtain schemes disclosed cannot discern which individual product is detected, or even if multiple products were dispensed.

Detection of successfully vended product is also possible using capacitive sensing techniques, as described in U.S. Pat. No. 7,073,683. Such a sensor arrangement has the same drawbacks as discussed above for light curtains, but also needs special tuning to account for product size variability.

Yet another method is the attachment of radiofrequency (RF) identification (ID) tags to the product to be vended themselves, as described in U.S. Pat. No. 7,053,773. These ID tags are electronically read by an RF tag reader to know both physical location of the inventory and even inventory type. RF identification methods can be made to support the detection of multiple simultaneous product vends, but suffer from the expense of the RF tag receiver electronics, and the costs of preparing all the vended inventory with RF ID tags.

Finally, with improvements in processing power, it is possible to position a video camera at the product collection area and apply image recognition algorithms to determine that product has properly vended, as described in Chinese Patent Application No. 107833361. These types of systems attempt to offer a more cheat-resilient alternative to simple light curtains. They do require substantially more complexity in the control electronics and processing power requirements. At this time, even modest levels of image recognition processing typically require support from cloud services.

U.S. Pat. No. 8,234,007 describes the use of a plurality of cameras mounted on the door and facing each of the product delivery tracks to determine proper vending of product form a spiral-vended snack machine. These cameras also are used to verify the product type and corresponding pricing to be communicated to the customer.

Similarly, U.S. Pat. No. 10,803,434 describes the use of several cameras in combination with other sensors previously described, such as infrared and RFID, to be used for product detection leveraging remote cloud databases and processing.

The following disclosed invention builds and improves upon the intelligent rolled coin dispensing safe with inventory scanning technology described in U.S. Pat. No. 9,619,957. Further, the techniques described in U.S. Patent Application Publication No. 2019/0156612 leverage distributed vending intelligence. Both these disclosures are commonly assigned with the present application, and are hereby incorporated by reference in their respective entireties.

SUMMARY

Illustrative embodiments provide an item dispensing system comprising a dispensing assembly that includes an inventory of items to be dispensed that are stored in tracks affixed to a slide out drawer. Each track has its own motor-driven coil or other mechanism to advance items to an item drop region. An intelligent detector circuit located above the front of each track monitors the quantity of items loaded into each track of the drawer, and the success or failure of items to enter the item drop zone when vended. An indicator light located at the front of the track also establishes the type of items loaded to the operator during item loading.

The item dispensing system in some embodiments is configured to detect successful vending of motor-driven items through the use of a reflective optical detector located above the first position of a vend track closest to the item drop region.

In some embodiments, the item dispensing system is configured to determine whether an item has successfully vended by monitoring the rate at which the light reflected off the vended item falls off as the item falls into the item drop region.

In some embodiments, the item dispensing system is configured to enable selection and vending of multiple items simultaneously, with assurances that each of the selected items is properly vended to the item drop region.

The item dispensing system in some embodiments is configured to detect attempts to tamper with the inventory inside the item dispensing system by monitoring all items located in a first position of a vend track closest to the item drop region for motion when those items are not actively being vended.

The item dispensing system in some embodiments is configured to determine if there is a jam or misorientation of either the item to be vended or the vending mechanism through the monitoring of the reflective optical detector.

In some embodiments, the item dispensing system is configured to use emitters of a reflective optical detecting system to indicate the type of item loaded into a corresponding vend track, and to further indicate any sensed problems detected associated with that track or items within that track, such as item jams, dislodged vending coils, motor drive difficulties, etc.

In illustrative embodiments, a novel item dispensing assembly is provided. Various embodiments are described herein with respect to use of an item dispensing assembly to vend rolls of change, including rolled packs of coin of various denominations, as well as hollow tubes with rolled or folded banknotes inside. Typically, equipment of this nature is used extensively in retail environments where merchants pay substantial quantities of coin and small banknote denominations as change for cash transactions. Placing change rolls in a protected dispenser limits the exposure of the retail store to large values of change that may otherwise be lost or stolen. It should be recognized that the item dispensing assemblies described herein can be used to vend other types of products typical of more traditional style vending machines such as snack foods, high value merchandise, pharmaceuticals, tools, parts inventory for factories, etc.

These and other features and advantages of the invention will become more readily apparent from the accompanying drawings and the following detailed description.

DETAILED DESCRIPTION

Figure 1A:
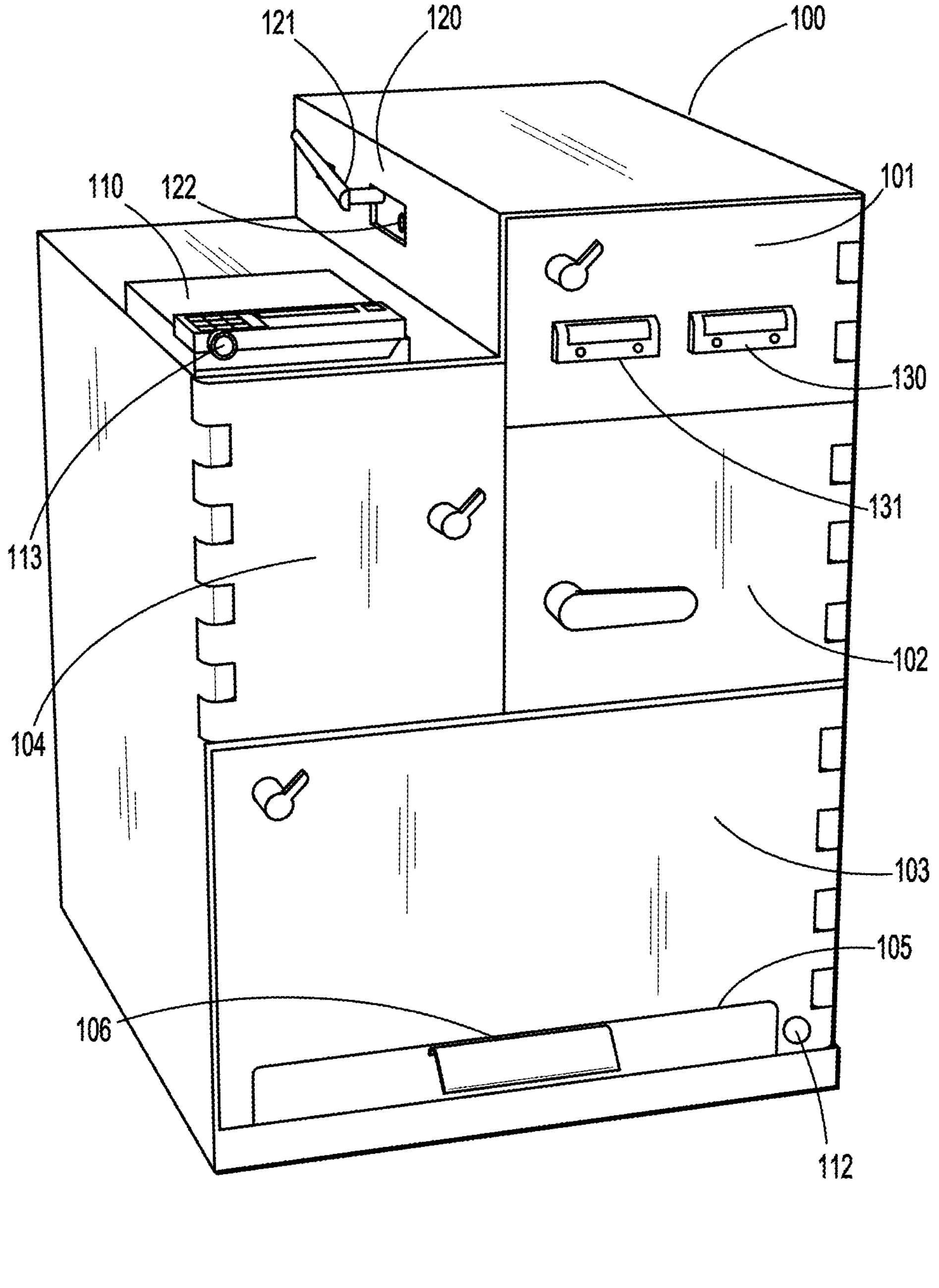
FIGS. 1A and 1B show views of a smart safe containing a change dispensing assembly with its dispense drawer in closed and opened positions, in accordance with an embodiment of the invention.
Figure 1B:
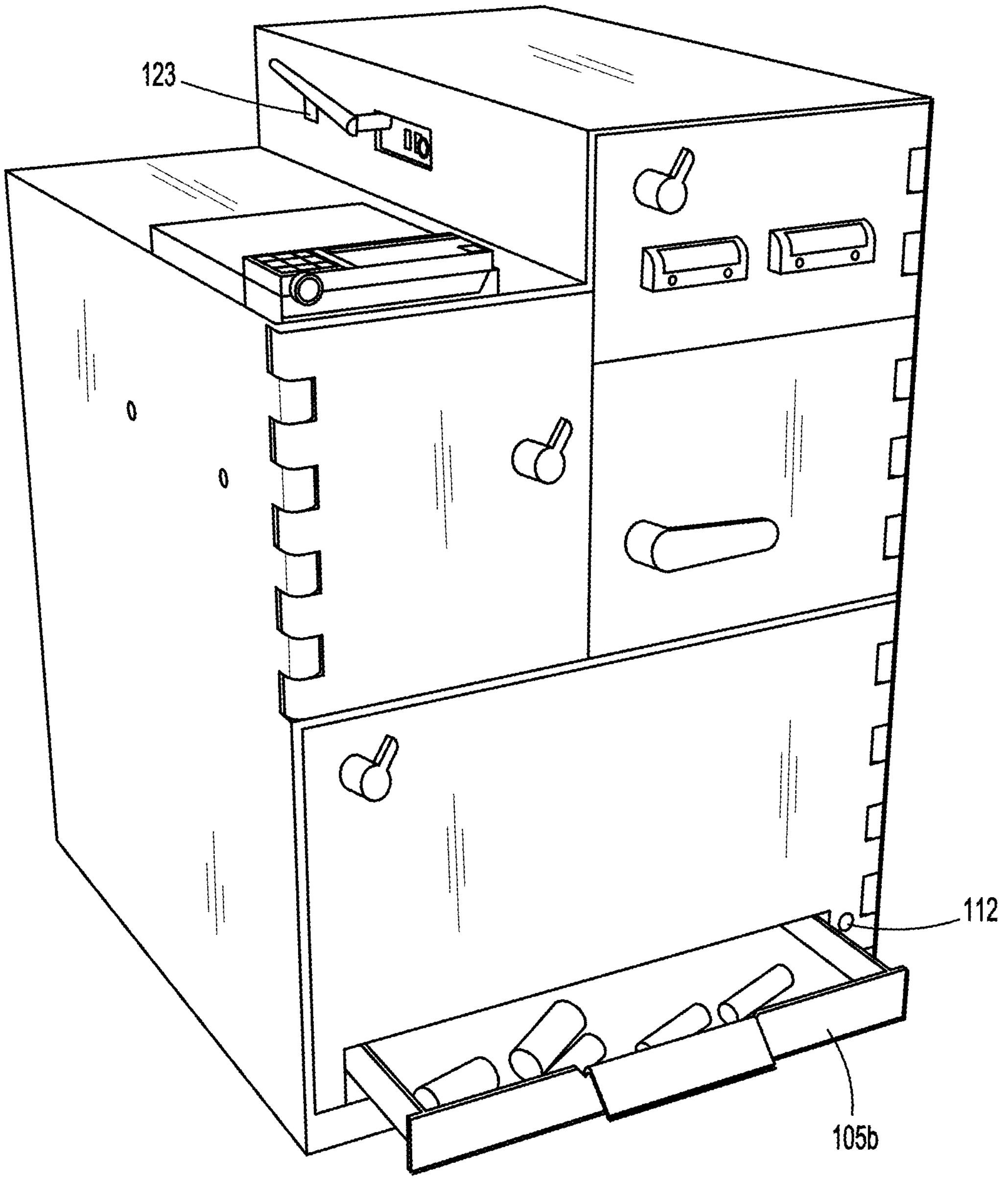

A change dispensing smart safe 100 in accordance with an embodiment of the invention is shown in FIGS. 1A and 1B. The change dispensing smart safe 100 is characterized by having a service door 101, a cash door 102, a change inventory door 103, and a storage locker door 104. Each of the doors 101, 102, 103 and 104 protects a corresponding protected compartment within the safe 100, and is preferably controlled with electronic locks. An opening in inventory door 103 allows for a lockable dispensing drawer 105 to slide outward to an open position 105*b* as illustrated in FIG. 1B. An indicator light 112 next to the lockable dispensing drawer 105 is used to indicate when the user should interact with the lockable dispensing drawer 105.

Bill validators 130 and 131 are configured to accept and electronically validate cash deposits from smart safe users for the purpose of providing payment for a change order to be vended from the safe 100's inventory, or for the purpose of a cash deposit to the store's cash deposit fund. Cash received from the bill validators 130 and 131 are stored within cash cassettes protected behind the cash door 102.

Smart safe users can place orders for change, request access to various compartments within the safe 100, make cash deposits, or perform other safe configuration or user adjustments through a safe user interface 110 with a keypad and display. Users may authenticate themselves with the safe 100 using the keypad of the user interface 110, with the use of an iButton™ fob presented to fob reader 113, combinations thereof, etc. They may additionally authenticate through the use of a wireless radio fob or device linked with a point-to-point secure wireless radio link with the safe 100, preferably using a Bluetooth Low Energy link.

All activities and transactions performed at the smart safe 100 are communicated to a web host using a network connection located on interface plate 122, preferably using a cellular link via cellular antenna 121. Alternatively, a WiFi link or hardwire ethernet connection to web services can be established.

AC line power is received into the smart safe 100 through port 123 shown in FIG. 1B, and is used for powering all safe electronics, including the bill validators 130 and 131, control electronics, and change dispenser.

Figure 2:
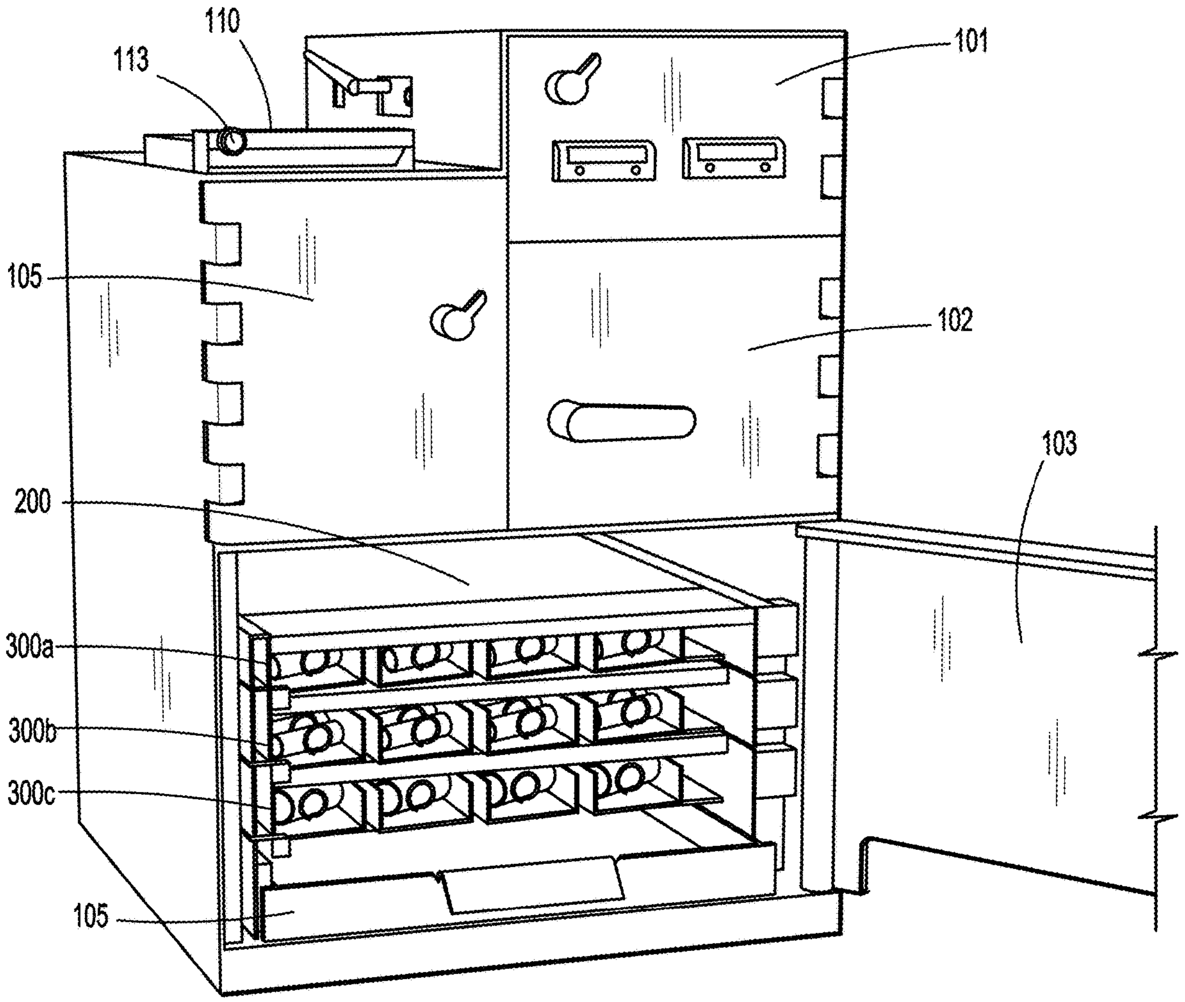
FIG. 2 shows a smart safe containing a change dispensing assembly with an inventory door open showing a view of a change dispenser therein, in accordance with an embodiment of the invention.

The change inventory is stored within a change dispenser system assembly 200 shown in FIG. 2. The assembly comprises three pull-out inventory drawers of change 300*a*, 300*b*, and 300*c* (collectively, inventory drawers 300). Each of the inventory drawers 300 contains four tracks of change inventory, for a total of twelve tracks of inventory in the inventory assembly. It should be appreciated, however, that any number of drawers and tracks may be used. Accordingly, there can be more or fewer tracks per draw than the particular number of tracks per drawer shown in the figures. For example, in some embodiments, there can be a single track per drawer, or multiple levels of tracks per drawer.

Figure 3A:
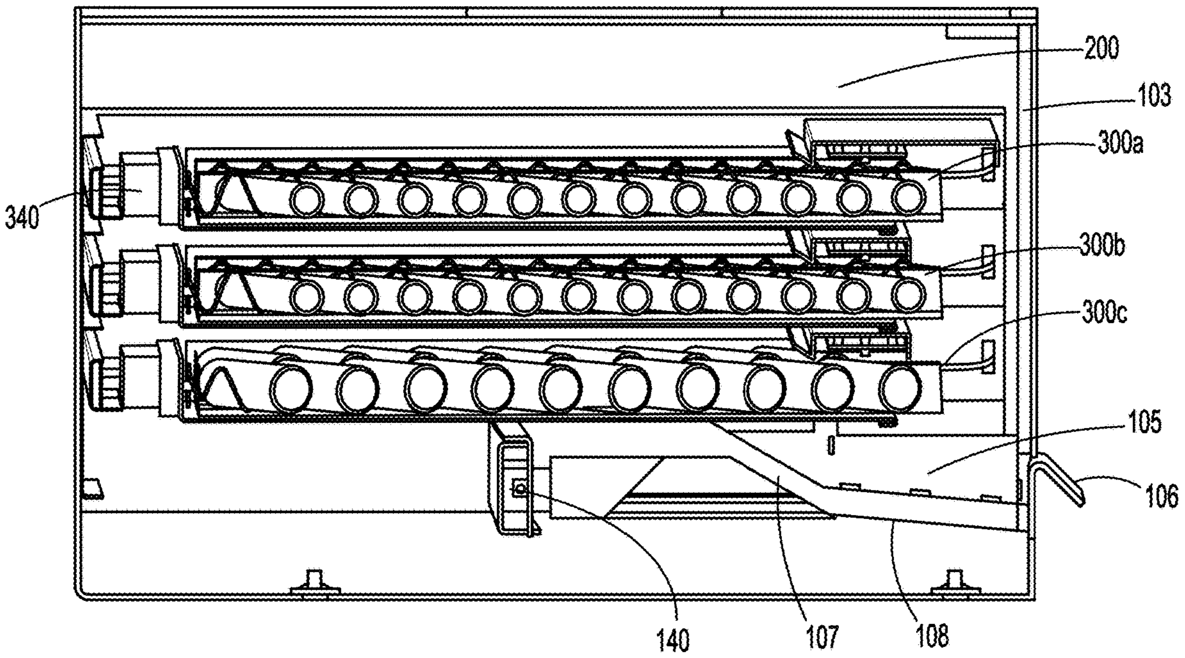
FIGS. 3A and 3B shows cutaway side views of a change dispensing assembly with a dispense drawer in closed and open positions, in accordance with an embodiment of the invention.
Figure 3B:
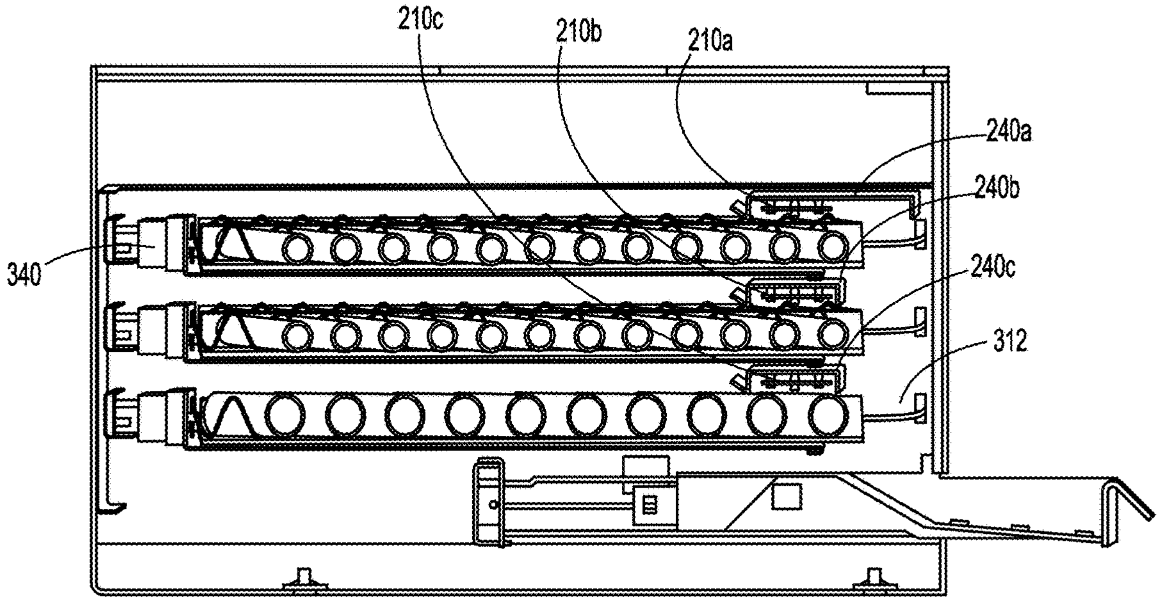

A left side cutaway view of the change dispenser system assembly 200 is shown in FIG. 3A, illustrating the arrangement of the inventory drawers 300, with the dispense pull out drawer 105 arranged below in the closed and locked position. The dispense drawer 105 is locked by electronic lock 140. When dispensing inventory, rolls of change 330 (shown in FIG. 5) advance towards the front of the safe 100 (towards the right side of the drawing of FIG. 3A) by powering a spiral 320 (shown in FIG. 5) to turn in the clockwise direction with a corresponding electric motor 340. Preferably, the dispense drawer 105 is in the unlocked, extended position, as shown in FIG. 3B, prior to vending any change rolls 330.

Dispense drawer 105 is characterized by having a pull handle 106 accessible by the operator of the smart safe 100, a sloped change impact surface 107, and a more gradually sloped delivery area 108. When one of the change rolls 330 is vended from one of the twelve tracks, it falls off the edge of the track in the drop zone between the track edge and the inventory door 103 until it lands on the drawer impact surface 107. The change roll 330 will be compelled to roll down the drawer impact surface 107 and towards the front of the dispense drawer 105 by the gradual forward slope of the delivery area 108. By opening the dispense drawer 105 prior to vending, the capacity of the inventory drawer to hold vended change is greatly increased compared to when the dispense drawer 105 is closed and there is room for change rolls 330 to bias forwards away from the drop zone of other vended change to avoid pileup of product.

Figure 4A:
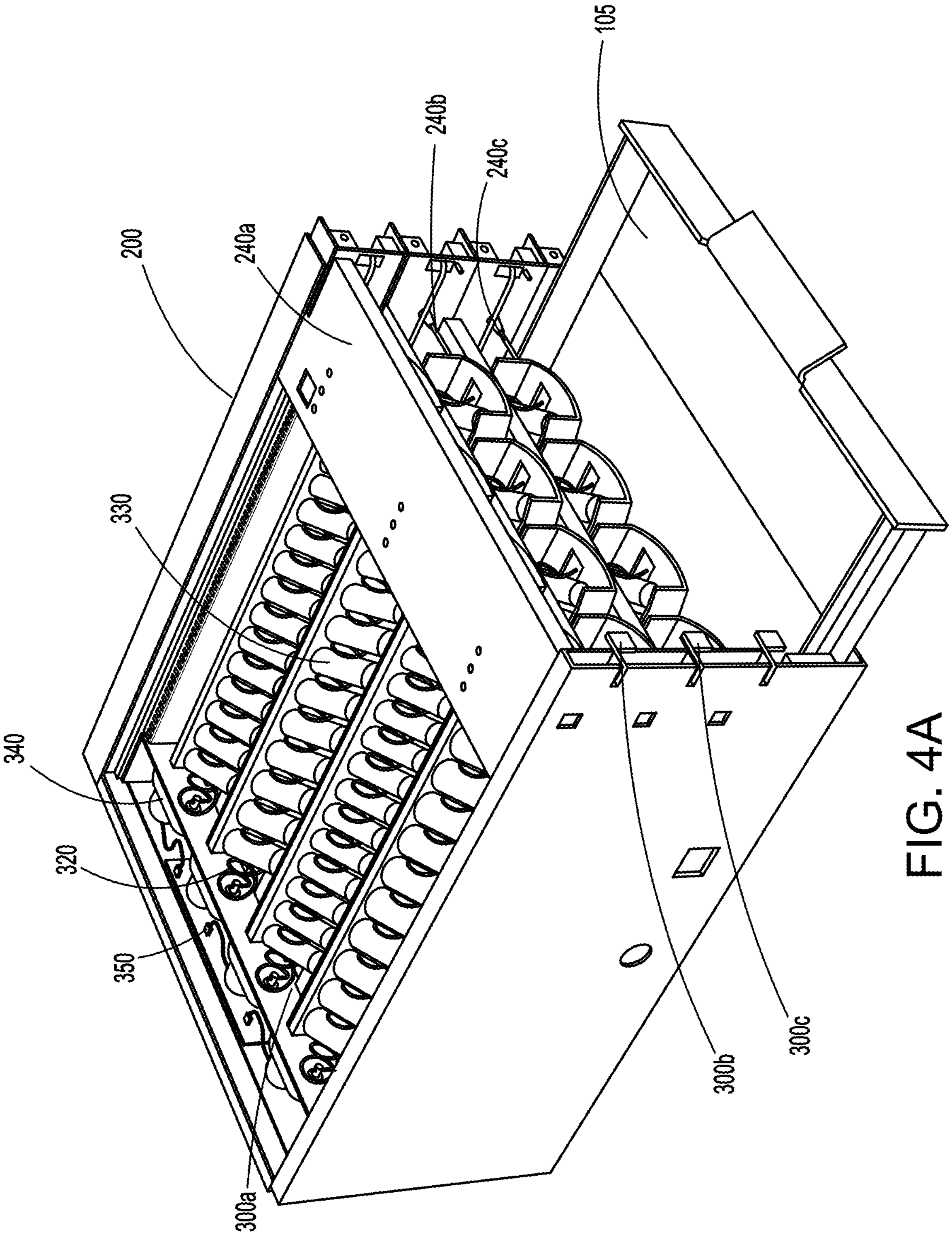
FIGS. 4A and 4B show views of the dispensing assembly subsystem with both an isometric top left-side view of a dispenser assembly with a dispense drawer in an open position, in accordance with an embodiment of the invention.
Figure 7:
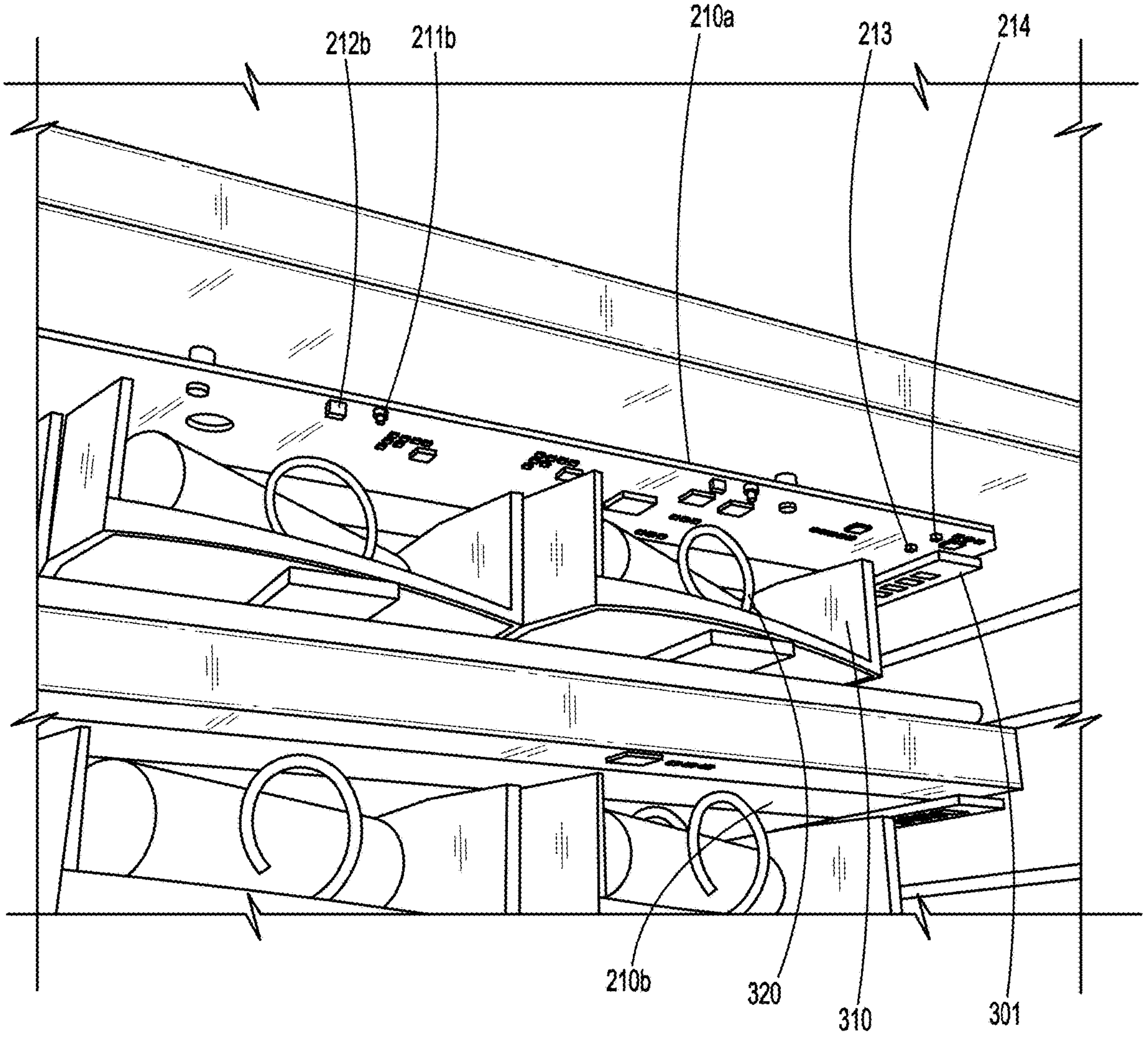
FIG. 7 shows a perspective view of a front track portion looking up at an inventory detector circuit board above, in accordance with an embodiment of the invention.

The change dispenser assembly 200, shown absent of the smart safe 100 in FIG. 4A, includes a frame configured to hold the three inventory drawers 300*a*, 300*b*, and 300*c*, along with one dispense drawer 105. The inventory drawers 300 and dispense drawer 105 slide on bearings inside tracks in the walls of the dispenser assembly 200. At the front of the dispenser assembly 200 there are detector brackets 240*a*, 240*b*, and 240*c* (collectively, detector brackets 240) rigidly affixed above each of the three inventory drawers 300*a*, 300*b* and 300*c*. The detector brackets 240 hold change detector circuitry 210*a*, 210*b*, and 210*c* (collectively, detector circuitry 210), which are shown in FIGS. 3B and 7. The change detector circuitry 210 are configured for electronically monitoring inventory added or vended from the change dispenser assembly 200. The upper most detector bracket, 240*a*, is preferably extended forward from the middle and bottom drawer detector brackets 240*b* and 240*c*, for the purpose of blocking additional ambient room lighting from hitting the change detector circuitry 210 while loading change into the machine.

Figure 4B:
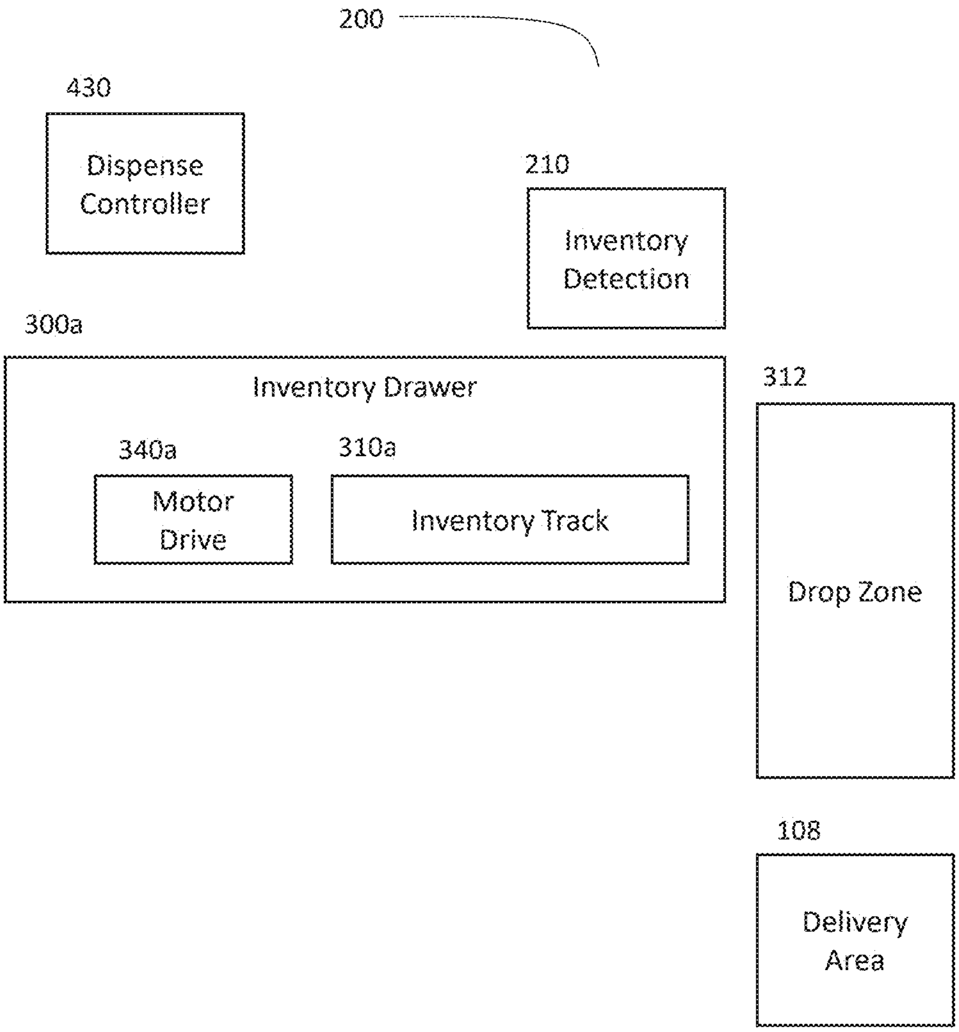

FIG. 4B shows a diagram of a simplified arrangement of dispenser system assembly 200 containing an inventory drawer 300*a* comprising at least one motor drive 340*a* coupled to an inventory track 310*a*. The motor drive 340*a* is commanded by dispense controller 430 to vend inventory within the inventory track towards drop zone 312. An operator of the dispenser system assembly 200 can retrieve the vended inventory in delivery area 108. The dispenser system assembly 200 can be broadened to include multiple inventory tracks within an inventory drawer, or broadened further to contain multiple inventory drawers each with their own set of one or multiple inventory tracks. In some embodiments, it is preferred that the inventory dispenser contains three drawers, each with four inventory tracks.

Figure 5:
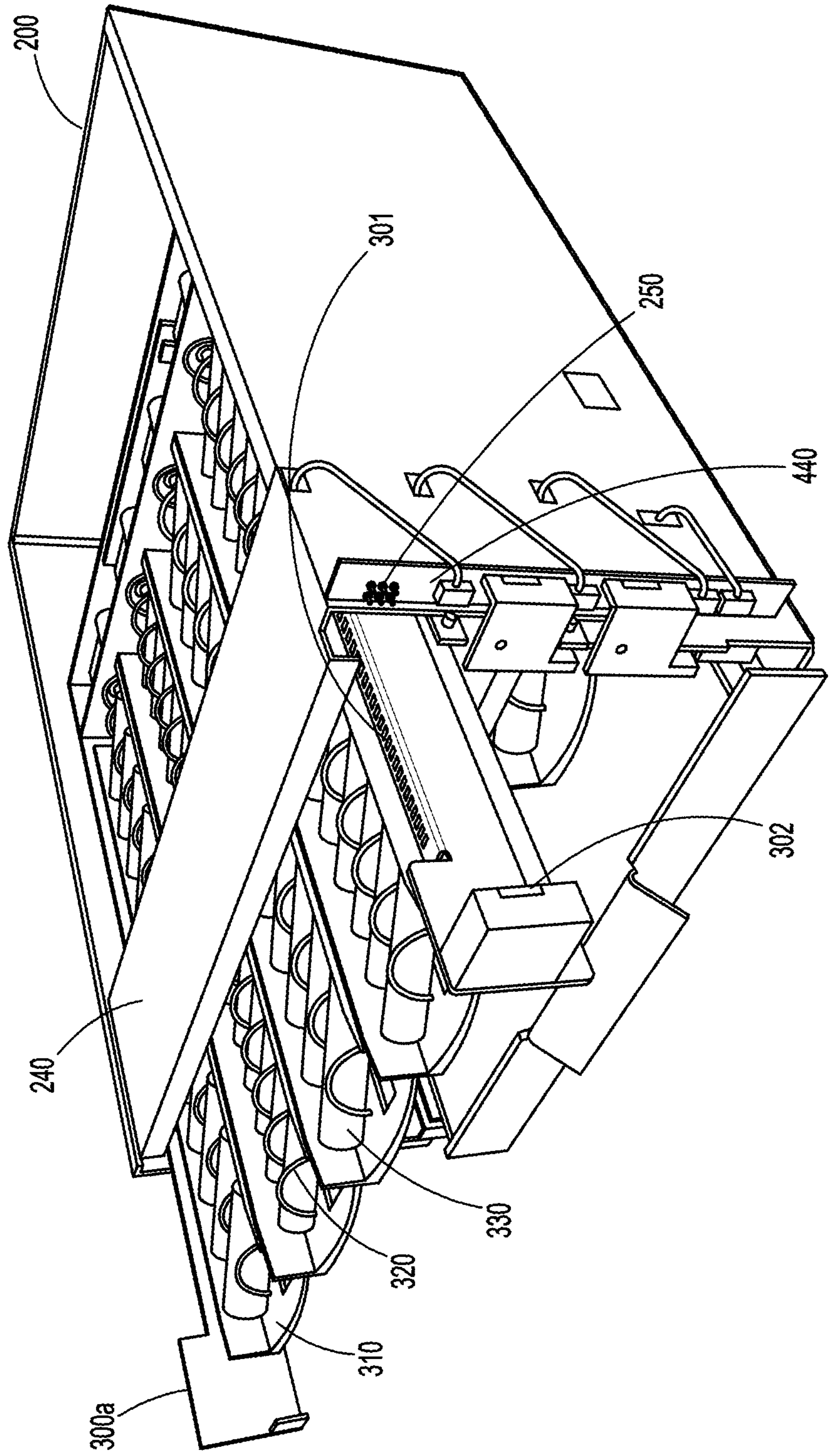
FIG. 5 shows an isometric top right-side view of a dispenser assembly with a top drawer partially opened, in accordance with an embodiment of the invention.

FIG. 5 shows the change dispenser assembly 200 viewed from the front-right perspective, with the top inventory drawer 300*a* partially opened. A perforation pattern 301 is placed in a flange extending from the right side of the inventory drawer 300*a* for the purpose of creating a pattern of light and dark reflections when the inventory drawer 300*a* slides under the corresponding detector board 210, discussed in greater detail below. When the inventory drawers 300 are opened, power and serial communication connections that are carried on spring loaded pogo pins 250 detach from a drawer signal contact board 302. In this way, the inventory drawers 300 can be completely removed from the change dispenser assembly 200 without any hardwire electrical connections interfering with removal of the inventory drawers 300.

Figure 6:
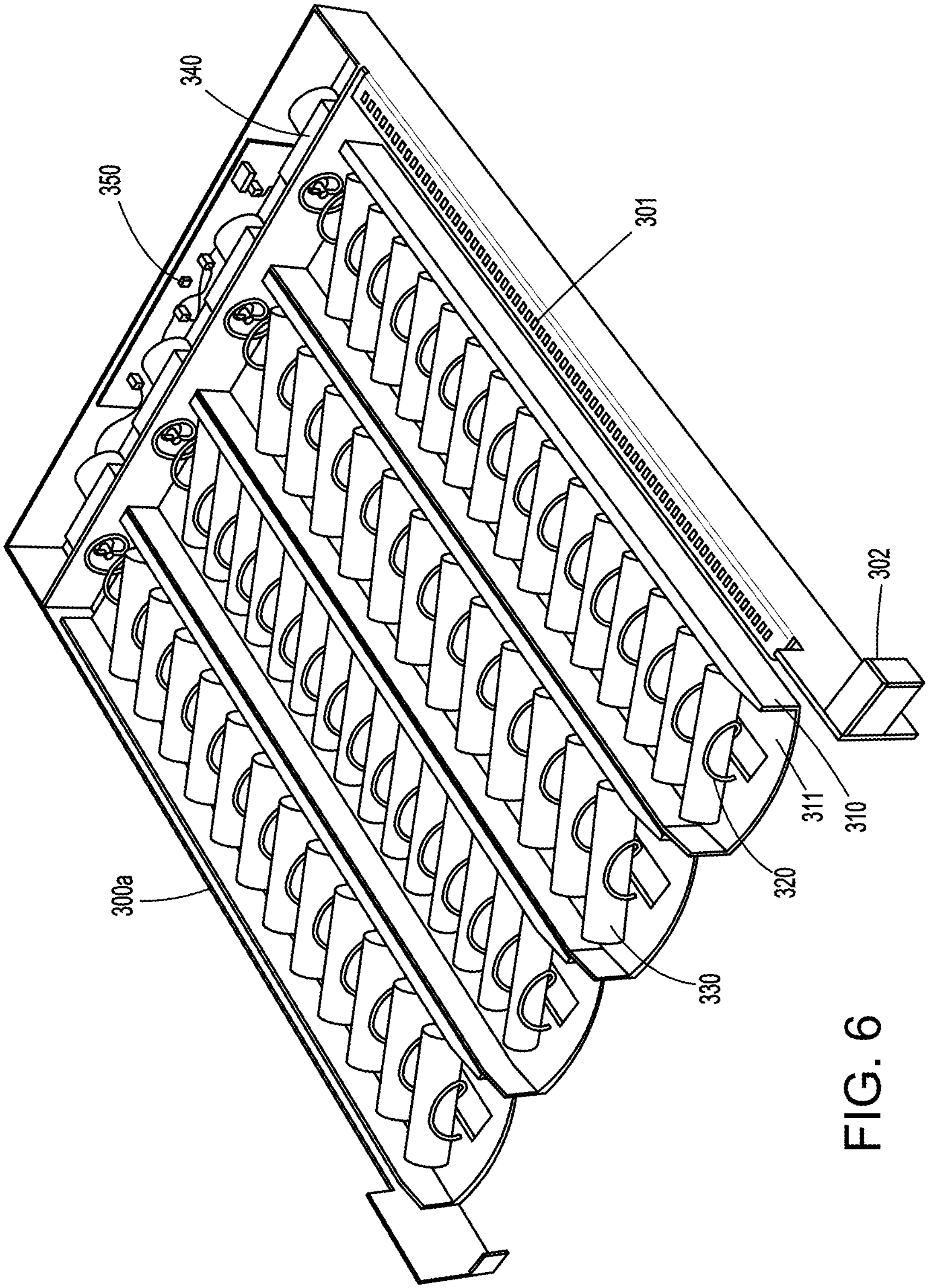
FIG. 6 shows a detailed view of a top inventory draw within a change dispensing assembly, in accordance with an embodiment of the invention.

FIG. 6 shows the inventory drawer 300*a* in isolation. As shown in FIG. 6, the inventory drawer 300*a* includes four inventory tracks 310, preferably molded from plastic. Change rolls 330 of various types and denominations sit on top of each of the inventory tracks 310 inside of corresponding spirals 320 with a pitch selected based on the diameter of the change rolls 330 placed therein. In the preferred embodiment, an inventory track containing rolled pennies would have fifteen spiral pitches. Dimes, though smaller than pennies, could comfortably fit in the same fifteen pitch spiral. Quarters and nickels, being a bit larger, would preferably fit in a thirteen pitch spiral over the same length inventory track. Larger hollow tubes designed to hold rolls of paper notes would fit in a ten pitch spiral.

Each of the spirals 320 couples to its own motor 340, to drive change rolls 330 forward. Various mechanisms may be used for coupling the spirals 320 to drive motors 340. Preferably, these coils are directly inserted into a hole diametrically drilled through the motor drive shaft for case of installation and removal. The drive motors 340 are driven by motor controller circuitry 350 mounted at the back of the inventory drawer 300*a*. The motor controller circuitry 350 includes a microcontroller coupled to a serial interface and four independent motor drivers, one for each of the four drive motors 340 on the inventory drawer 300*a*. Power and a serial communication interface are received through the contact board 302 from the pogo contacts 250. Those signals are sent down a cable affixed under the right side of the inventory drawer 300*a* under the perforated flange 301, and connected into the motor controller board 350. It should be appreciated that the inventory drawers 300*b* and 300*c* may be configured in a manner similar to that of inventory drawer 300*a*, though the particular number of inventory tracks and corresponding spirals and driver motors may vary as desired for different ones of the inventory drawers 300.

Inventory detection is performed using inventory detection boards 210*a* and 210*b* (collectively, inventory detection boards 210), shown in detail in FIG. 7, which is positioned at the front edge of each of the inventory drawers 300. The inventory detection boards 210 include a microcontroller, a serial communication interface, and at least one light emitter and at least one light receiver above the front of each of the four track positions of the inventory tracks 310 of the inventory drawers 300. The inventory detection board 210*a* for inventory drawer 300*a*, for example, includes a set of four light emitters 212*a*, 212*b*, 212*c* and 212*d* (collectively, light emitters 212) and four light detectors 211*a*, 211*b*, 211*c* and 211*d* (collectively, light detectors 211), shown in FIGS. 7, 9 and 12. The light emitters 212 are preferably red, green, blue (RGB) light-emitting diodes (LEDs) configured to shine light on a space below. The light receivers 211 are configured to receive reflected light off any object at the front of its corresponding one of the tracks and converts it into a signal whose magnitude is proportional to the amount of light detected for interpretation by the microcontroller of the inventory detection board 210*a*. Additionally, there are two reflective infrared (IR) detectors 213 and 214 placed above the perforated flange 301 in a quadrature arrangement to sense the light and dark patterns reflected off the metal flange 301 as the inventory drawers 300 slide in and out.

Figure 8:
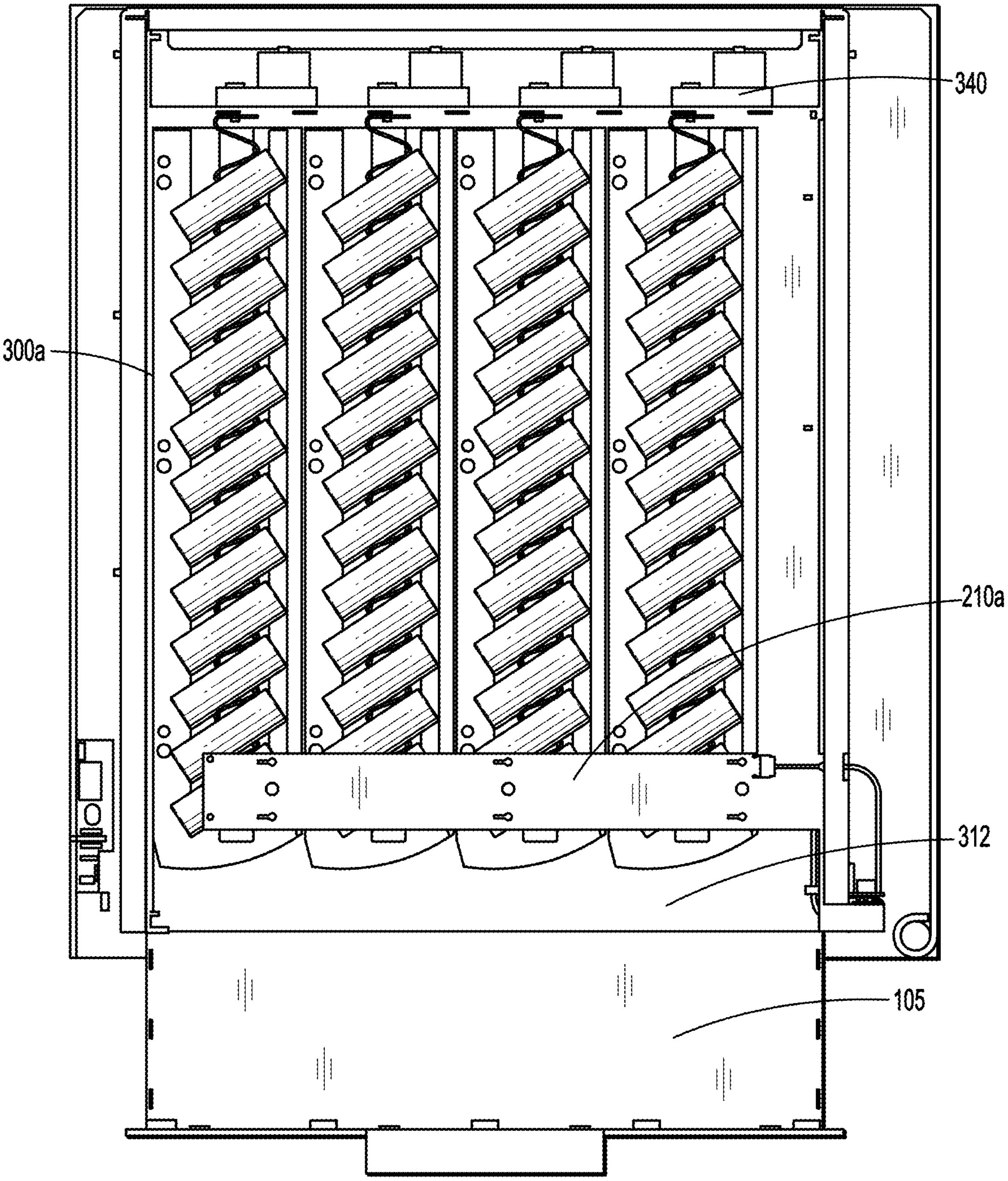
FIG. 8 shows a top-down cutaway view of a dispenser assembly with a detector board bracket hidden, in accordance with an embodiment of the invention.

FIG. 8 shows a top-down cutaway view of the inventory detection board 210*a* with respect to inventory drawer 300*a*. In the FIG. 8 view, the lockable dispensing drawer 105 is shown in the extended open position, where the inventory detection board 310*a* is shown with its corresponding bracket 240*a* hidden for clarity. A series of four vending motors 340 are shown at the back of the inventory drawer 300*a*.

Figure 9:
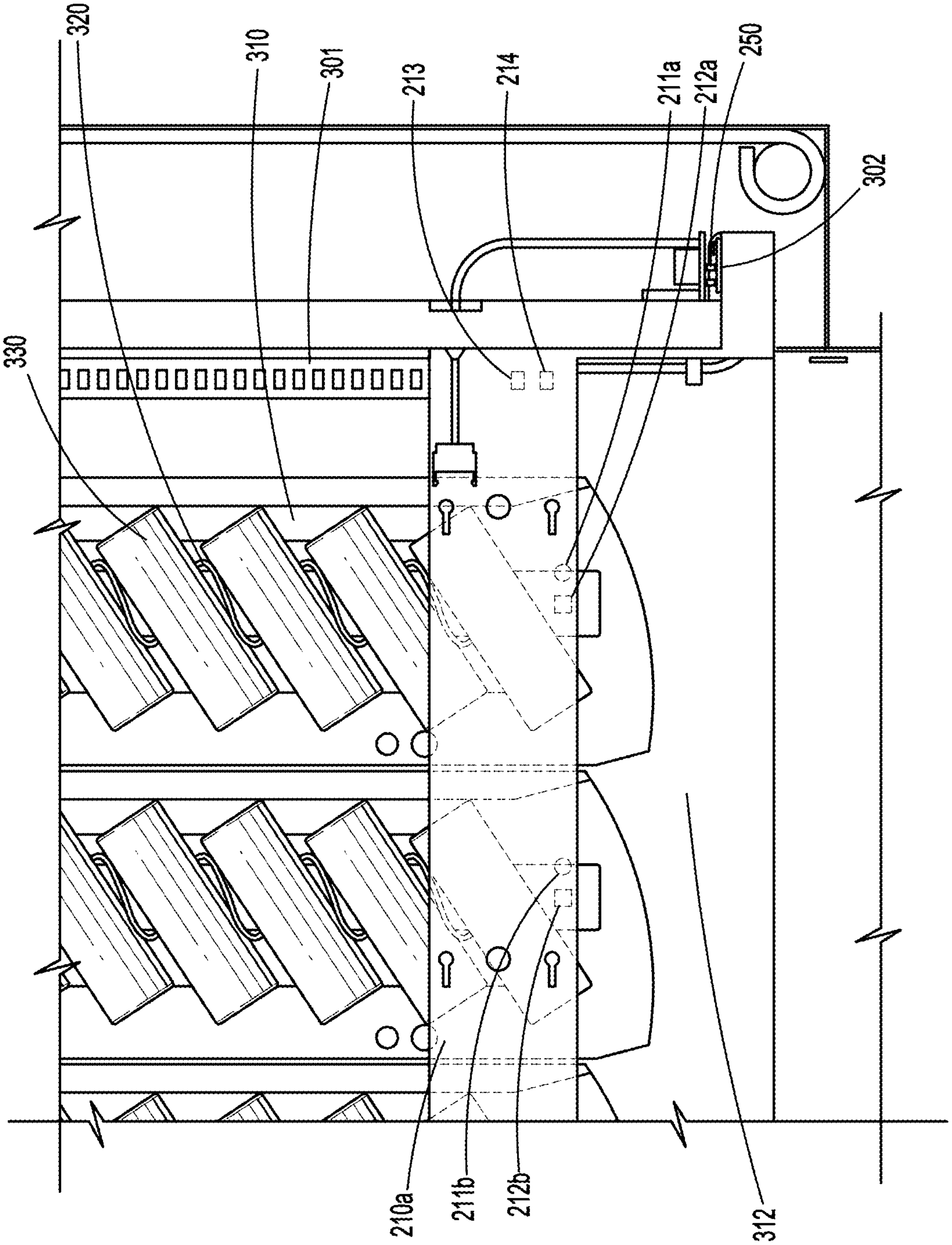
FIG. 9 shows a closeup view of the dispenser assembly of FIG. 8 illustrating detail on detector arrangement with the detector board made transparent, in accordance with an embodiment of the invention.

FIG. 9 shows a closer look in a perspective view highlighting locations of the various sensors. The light emitters 212*a* and 212*b* are shown centrally located at each track location, configured to substantially illuminate the contents of the tracks beneath the light emitters 212*a* and 212*b*. The corresponding light detectors 211*a* and 211*b* are positioned preferably forward of the forward-most change rolls 330, such that when the inventory drawer 300*a* is completely closed, the amount of light received by the light detectors 211*a* and 211*b* that bounce off the change rolls 330 below is substantially zero. For this reason, the light detectors 211*a* and 211*b* are preferably located to the right of the light emitters 212*a* and 212*b*, when viewed top-down as shown in FIG. 9. In this way, the change rolls 330 are slanted in the coils 320 away from the light detectors 211*a* and 211*b*.

Upon loading inventory, the inventory drawers 300 are pushed from the fully open to the fully closed position, while the inventory detection boards 210 remain stationary. The light detectors, such as light detectors 211*a* and 211*b* of inventory detection board 210*a* for inventory drawer 300*a*, see a modulation of reflected light bounced off the change rolls 330 (or other inventory) as the inventory drawer 300*a* slides underneath. When the inventory drawers 300 are fully closed, the reflected light received by the light detectors will be low, since the coils 320 biases the first position change rolls 320 behind the light detectors 211.

Figure 10A:
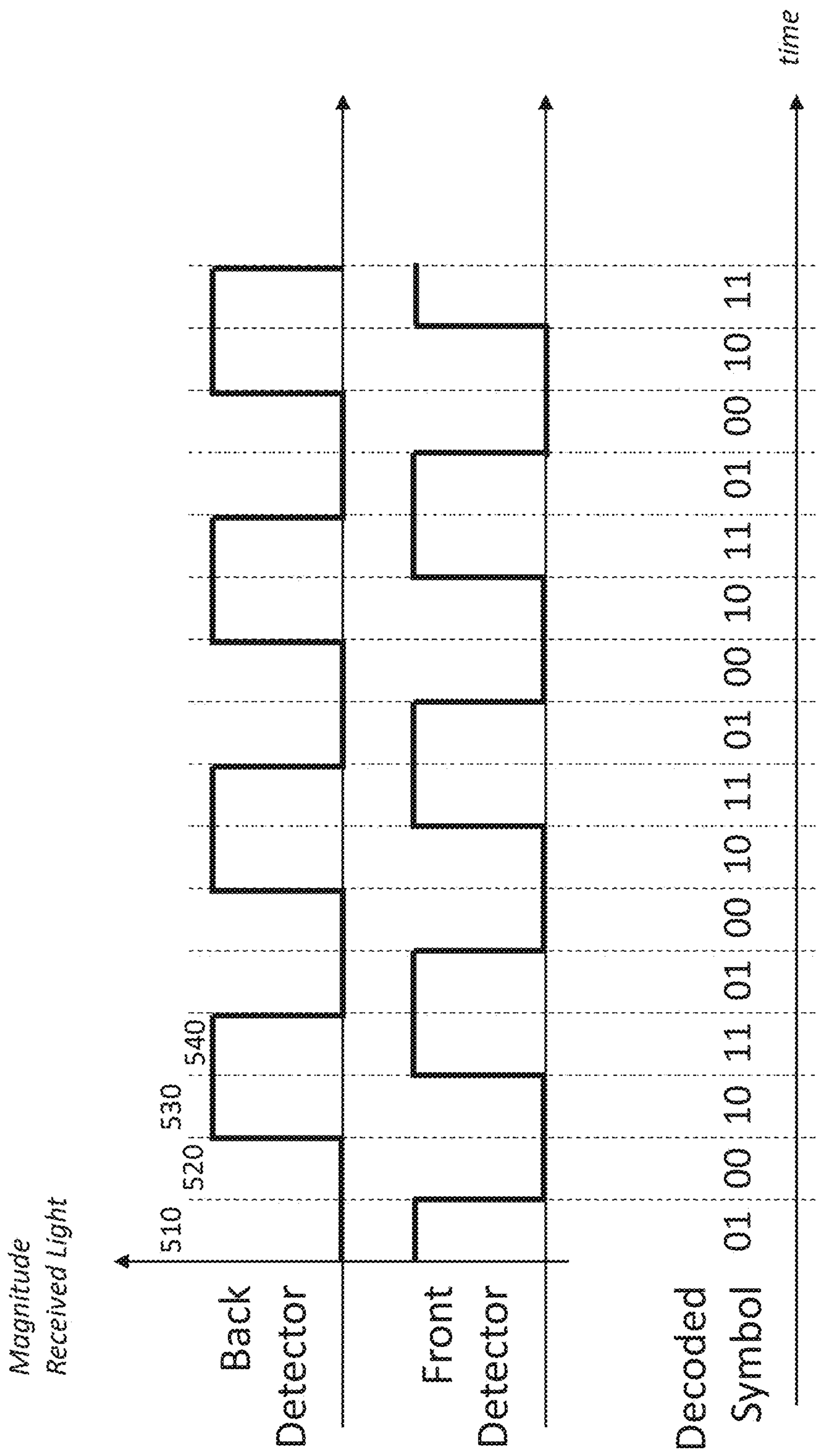
FIGS. 10A and 10B show diagrams illustrating quadrature decoding of drawer position sensors, in accordance with an embodiment of the invention.
Figure 10B:
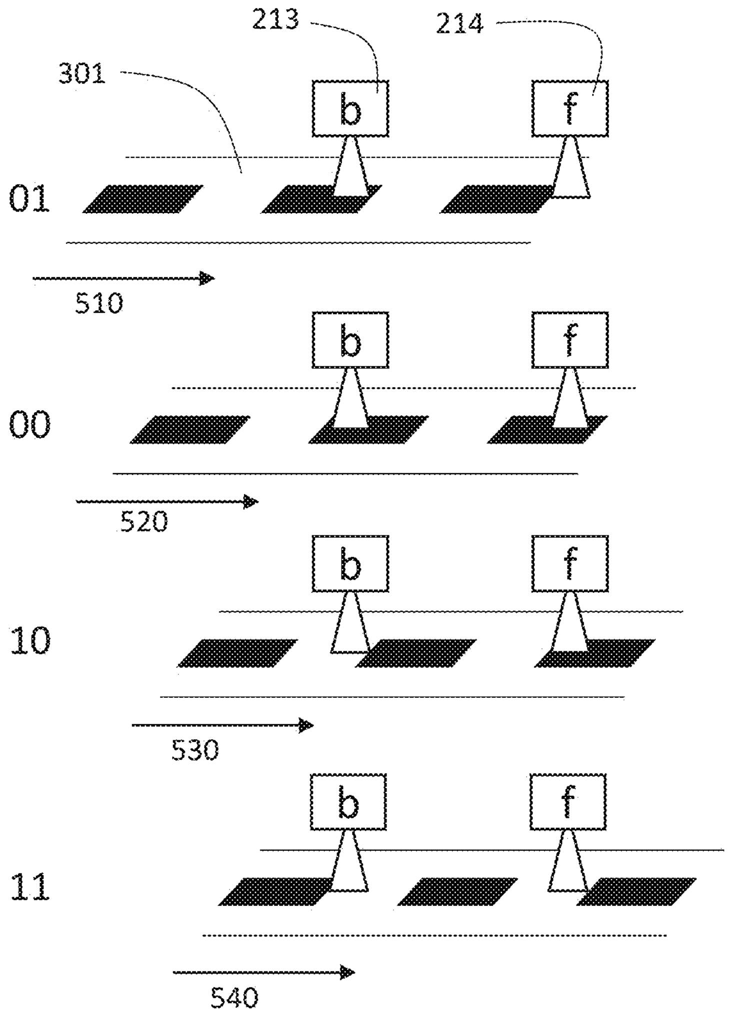

Reflective IR sensors 213 and 214 are positioned above the perforated flange 301 of the inventory drawer 300*a* to detect light and dark patterns that are quadrature phased with respect to one another as the inventory drawer 300*a* slides beneath the inventory detection board 210*a*. The quadrature decoding of the reflective IR sensors 213 and 214 is shown in FIGS. 10A and 10B. When the inventory drawer 300*a* is fully extended and the smart safe user starts to push in the inventory drawer 300*a*, the front reflective IR sensor 214 will detect a portion of the steel flange 301 reflecting a large magnitude of IR light back to the reflective IR sensor 214 interpreted as a logic high at a first position in the inventory drawer 300*a*'s sliding travel 510. The back reflective IR sensor 213, meanwhile, is positioned over a corresponding perforated opening on the flange 301 at the first hole position. As such, the back reflective IR sensor 213 will register a low magnitude of reflected IR light off the flange 301 which interprets to a logic low, making an overall position logic symbol of "01" expressing the back reflective IR sensor 213 level followed by the front reflective IR sensor 214 level. At the next position in the inventory drawer 300*a*'s slide travel 520, both the back and front reflective IR sensors 213 and 214 are positioned over perforated openings in the steel flange 301, therefore both register logic low levels having position logic symbol "00". In the third position of travel 530, the front reflective IR sensor 214 is still located over the same opening in as in the previous step and continues to register a logic low while the back reflective IR sensor 213 is over the reflective steel flange 301 registering a "10" position logic symbol. Finally, in a fourth position of travel 530, both the back and front reflective IR sensors 213 and 214 are above the reflective steel flange 301 surface and yield a position logic symbol of "11".

As described above and as shown in FIGS. 10A and 10B, a standard quadrature position encoding scheme is used that generates a pattern of symbols "01", "00", "10", "11" when detecting motion in a forward direction and alternatively a pattern of "01", "11", "10", "00" if detecting motion in the reverse direction. A benefit of this position encoding scheme is that it doubles the position resolution of the mechanical flange 301 perforation pattern, and adds in the ability to determine direction of motion. Preferably, the steel perforation pattern is 0.125 inches (in) rectangular slots with 0.125 in separation between slots or, in other words, a hole perforation pattern having a pitch of 0.25 in. For quadrature encoding, the centers of each of the reflective IR sensor 213 and 214 are 90 degrees out of phase with one other. For detecting linear motion as described, this means that:

$$\text{Distance between sensors} = \frac{N \times \text{Pitch}}{2} + \frac{\text{Pitch}}{4}$$

where N is an integer. In some embodiments, N=3 is used, such that there is a separation or distance between sensors of 0.4375 in.

Referring back to FIG. 9, upon vending inventory, coil 320 drives the change rolls 330 forward underneath the stationary inventory detection board 210*a*. The light detectors 211 will receive increasingly brighter reflections of light bounced off the change rolls 330 from light emitters 212, until approximately the point in time that the tallest part of the change rolls 330 are directly under the light detectors 211 for each of the inventory tracks 310. Shortly thereafter, the change rolls 330 will exit the coil 320 drive and begin rolling off the front of the ramp portion 311 (shown in FIG. 6) of the inventory tracks 310 towards the inventory freefall drop zone 312. The light detectors 211 are positioned to detect motion of the trailing portion of the change rolls 330 as they transition from the coil 320 drive to the ramp region of the inventory tracks 310 just prior to exit into the freefall drop zone 312.

Figure 11:
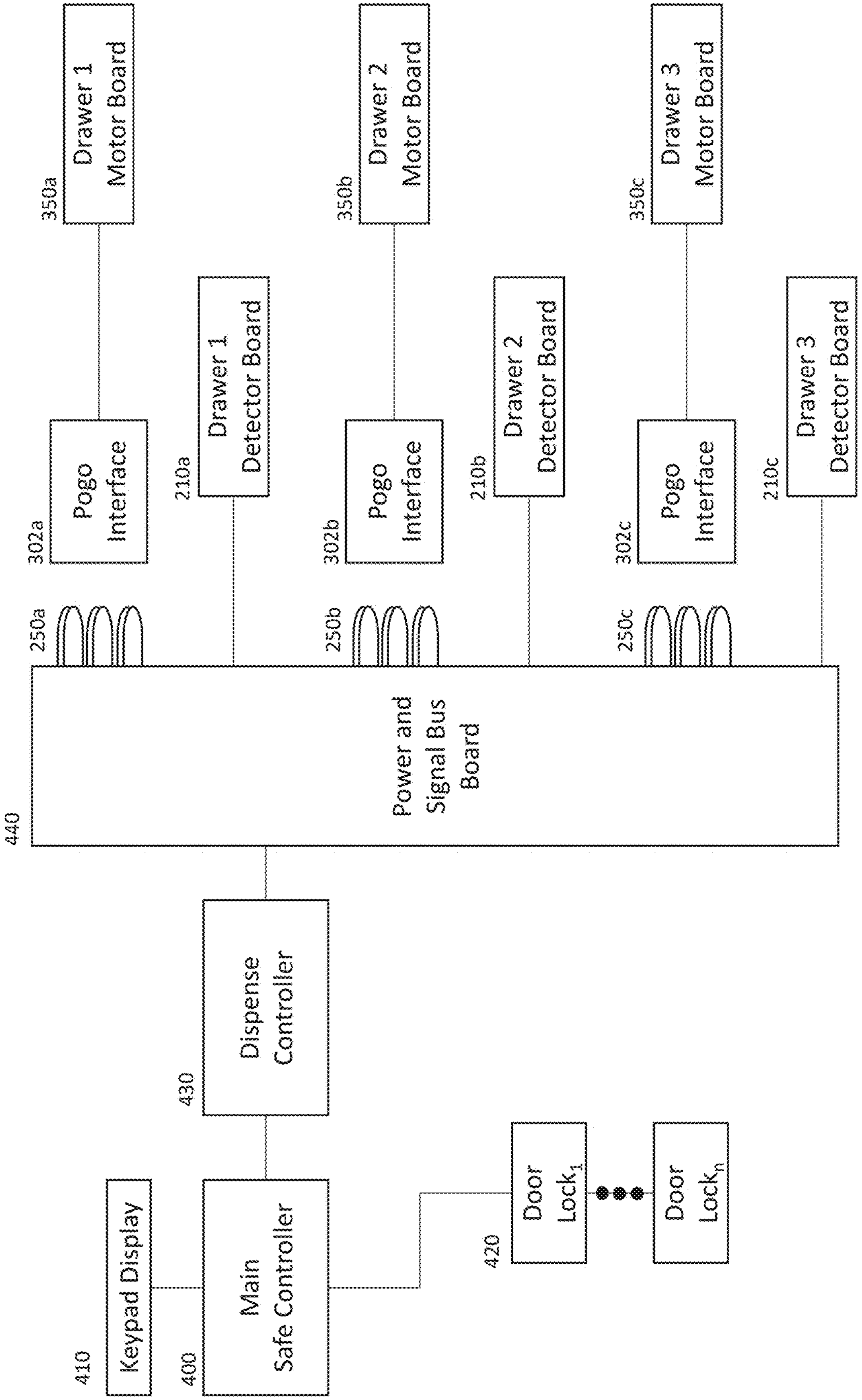
FIG. 11 shows a block diagram of electronics for a safe containing a dispensing assembly, in accordance with an embodiment of the invention.

FIG. 11 shows a diagram of a preferred arrangement of control electronics. For vending change, the smart safe user inputs their desired order at keypad display 410. The safe controller 400 receives user inputs from the keypad display 410 and communicates the order to dispense controller 430. The dispense controller 430 tracks the quantity and location of all inventory within the change dispenser. If the inventory is available, dispense controller 430 sends commands to the appropriate drawer motor board or boards 350*a*, 350*b* and 350*c* (collectively, drawer motor boards 350), and preferably energizes the motor supply voltage needed for driving the vending motor. Power and serial communication are sent to the drawer motor boards 350 using the pogo pin array 250 (including pogo pins 250*a*, 250*b* and 250*c*) rigidly mounted on the power and signal bus board 440 at the front of dispenser assembly 200 (e.g., as shown in FIG. 5). Pogo pins 250*a*, 250*b* and 250*c* of the pogo pin array 250 are pressed against pogo contact boards 302*a*, 302*b* and 302*c* (collectively, pogo contact boards 302 or pogo interfaces 302) affixed to each of the inventory drawers 300. The corresponding inventory detection boards 210*a*, 210*b* and 210*c* begin monitoring for vended inventory with their inventory reflective visible light sensors (e.g., light detectors and light emitters).

It will be understood that, with distributed intelligence systems like those shown in FIG. 11, it is necessary to have each board uniquely addressed for inter-board serial communications. Various techniques may be used to assign addresses to boards in such systems. In some embodiments, a method of automatic board address assignment is used that can be performed by an operator in a special configuration mode whereby the operator is asked to open the inventory drawers 300 in a prescribed sequence.

Figure 12:
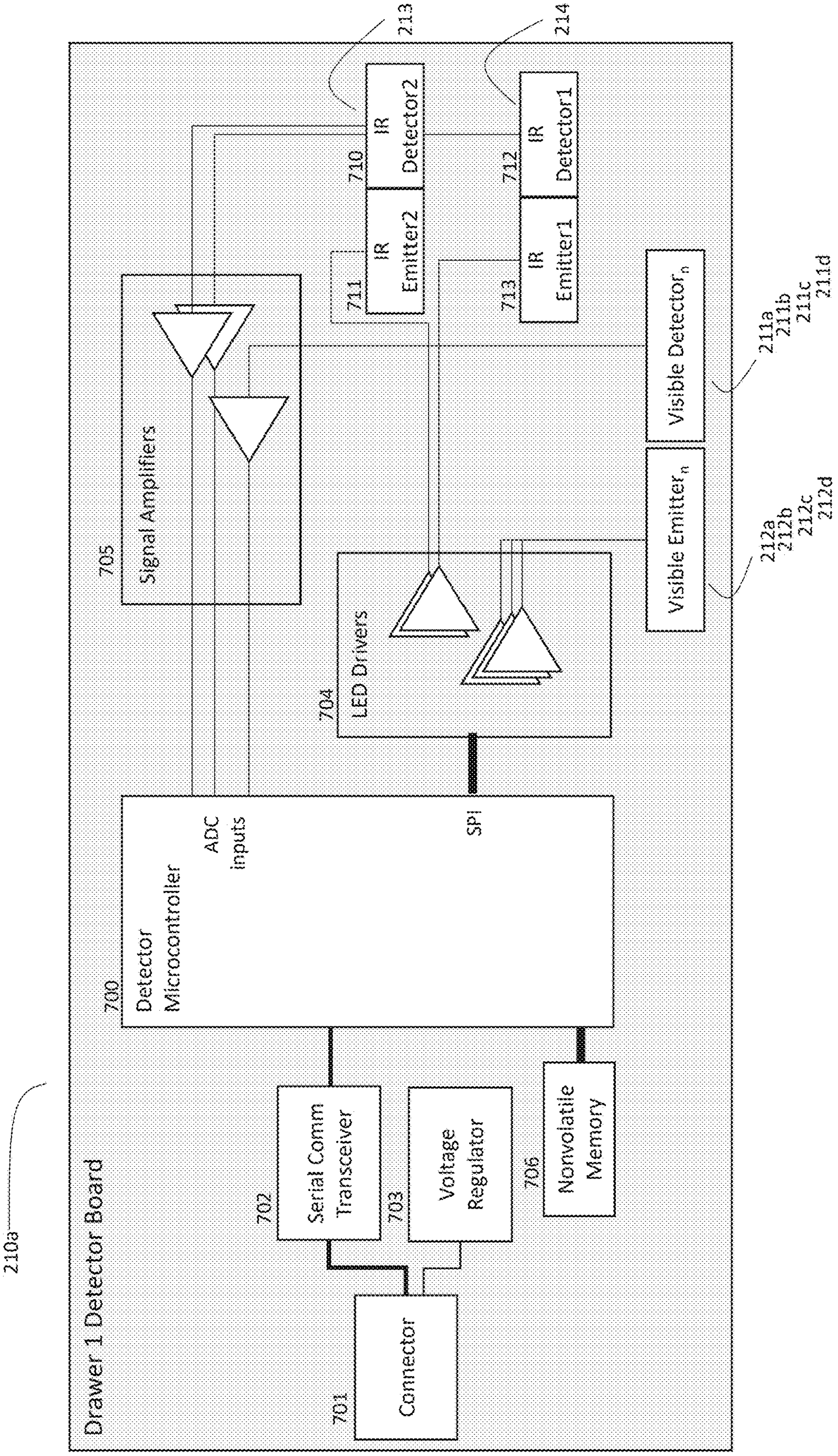
FIG. 12 shows a block diagram of electronics for a representative detector board, in accordance with an embodiment of the invention.

The inventory detection boards 210 are responsible both for the counting of change rolls 330 during inventory drawer 300 closing, and for monitoring of change roll 330 vending when motor boards 350 are driving the appropriate track spirals 320. FIG. 12 shows a circuit diagram of the inventory detection board 210*a* for inventory drawer 300*a*. The inventory detection boards 210*b* and 210*c* for inventory drawers 300*b* and 300*c* may be configured in a manner similar to that of inventory detection board 210*a*. Connector 701 brings in power and serial communication signals originating from dispense controller 430. The power from the connector 701 is preferably 5V, and is further regulated to 3.3V by voltage regulator 703 for the purpose of powering the detector microcontroller 700, LED drivers 704, and signal amplifiers 705. The serial communication connections to the inventory detection board 210*a* are preferably a multidrop, bi-directional link such as CANbus, RS485, USB, or I2C. It is preferable that the same communication link be used to connect all the inventory detection boards 210 and motor boards 350 to the dispense controller 430. The use of a multi-drop link reduces the number of electrical conductors needed in the cabling connecting all the inventory detection boards 210, thereby also limiting the number of necessary pogo pins 250 to pass to each respective motor board 350. The serial communication link terminates on a communication transceiver 702, preferably a CANbus transceiver controlled by the detector microcontroller 700.

Microcontroller 700 communicates with an LED driver 704, preferably a multi-channel digitally controllable driver, such as the NXP PCA9957, for controlling current to each of the on-board LED elements. LEDs on the inventory detection board 210*a* controlled by driver 704 include both infrared and visible RGB styles. The 940 nm infrared tachometer position sensor emitters 711 and 713 that make up half of a reflective infrared (RIR) sensor are driven constantly when the inventory door 103 is open. Corresponding IR detectors 710 and 712 are amplified by signal amplifiers 705 and fed into analog-to-digital converter (ADC) channels of microcontroller 700, where they are quadrature decoded in the manner previously described to detect the position of the inventory drawer 300*a*. LED driver 704 powers each of the light emitters 212 (e.g., which may comprise RGB LEDs, each of which take three separate drive channels for their respective red, green, and blue LEDs).

When the inventory door 103 is open and before the user pulls open any of the inventory drawers 300, the microcontroller 700 illuminates the RGB LEDs (e.g., light emitters 212) to preconfigured colors representative of the type of change rolls 330 stored within its corresponding track 310 location. This indicator color preferably follows the standard American Bankers Association rolled coin color scheme: red for penny rolls; blue for nickels; green for dimes; and orange for quarters. For tube inventory, white or any other desired color can be used. The inventory configuration and their associated indicator light colors is received over the serial link and stored in memory, either within microcontroller 700 or within an external on-board nonvolatile memory 706.

When loading coin or other inventory, the smart safe user pulls one of the inventory drawers 300 (e.g., inventory drawer 300*a*) to the open position, adds change rolls 330 to each of the inventory tracks 310 as needed, and then closes the inventory drawer 300*a*. During this process, the microcontroller 700 changes the behavior of the visible light emitters 212 from an indicator function previously described, to a color scanning function. When sliding the inventory drawer 300*a* open, the microcontroller 700 monitors the RIR sensor inputs and quadrature decodes the inventory drawer 300*a*'s position to know how far the inventory drawer 300*a* is opened. Preferably, the user is prompted to open the inventory drawer 300*a* entirely so that a complete scan of the inventory is possible. After inventory is added, and the operator begins to close the inventory drawer 300*a* as interpreted by the tach position pulses, the light emitters 212 are strobed across all three colors, red, green, blue, and off (dark), in rapid succession. Preferably, each color is strobed 160 times a second. Corresponding light from the light detectors 211 are amplified by signal amplifiers 705 and monitored by ADC channels on microcontroller 700.

Figure 13:
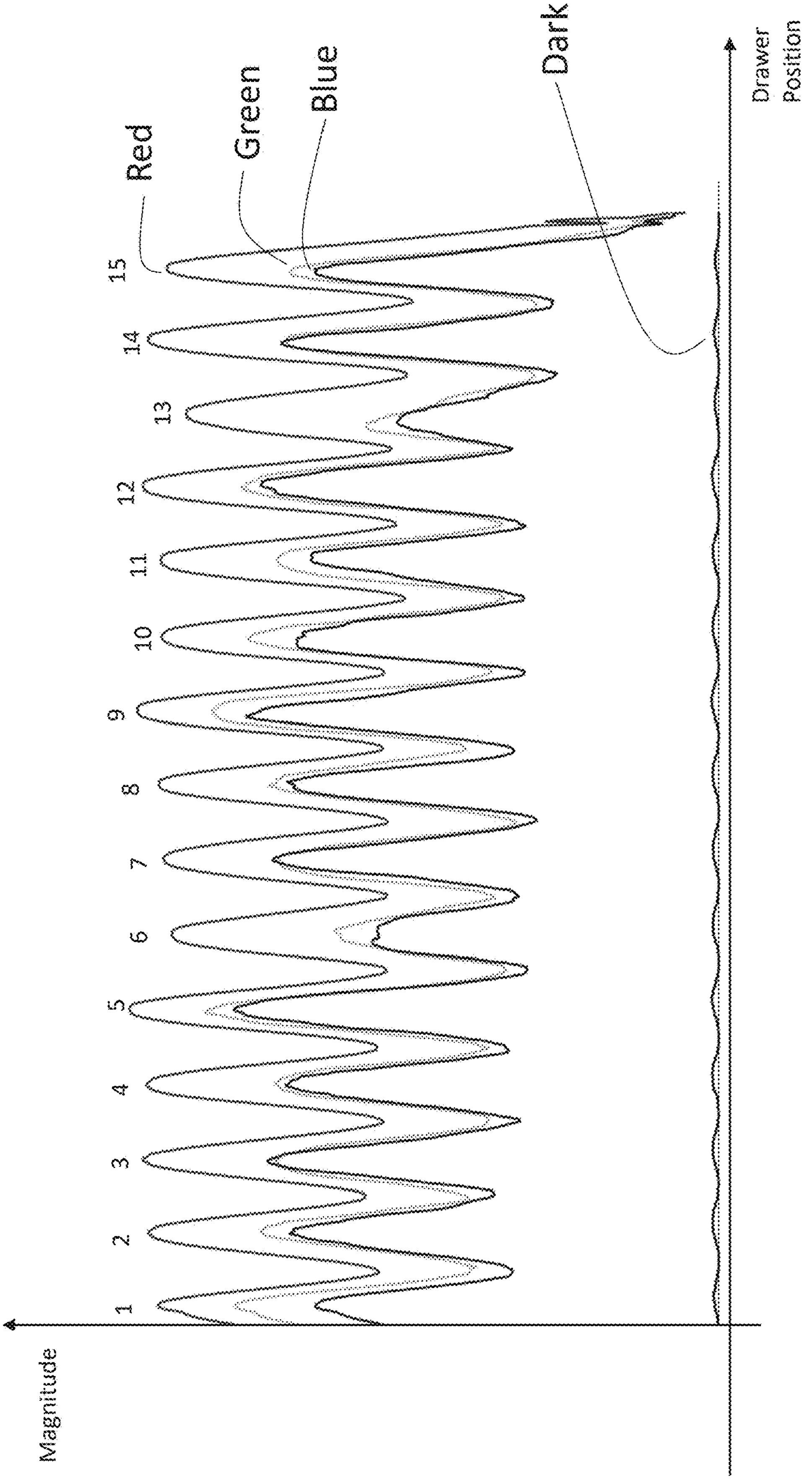
FIG. 13 shows a representative waveform of received reflected signals from different colored emitters, in accordance with an embodiment of the invention.

The resulting samplings of light from the light detectors 211 have magnitudes corresponding to how reflective the change rolls 330 are to each of the red, green, and blue strobed light at each position of the inventory drawer 300*a* closure. Red penny rolls, for instance, will produce larger magnitudes of received light on the light detectors 211 while the red LED component is lit in comparison to the blue and green LED components. FIG. 13 shows a graph of the magnitude of received light during a complete push of the inventory drawer 300*a* for an inventory track 310 filled with penny rolls. The magnitude for all colors and dark channel were collected by the same ADC channel of the microcontroller 700, but have been separated in the FIG. 13 graph by color and dark light channel and plotted against drawer position as interpreted by the tach sensor. The periodic dark sampling of received light from the light detectors 211 is helpful to measure the ambient light that superimposes on top of the measured reflections originating from the light emitters 212. Dark readings can be mathematically subtracted from the color light samplings within the microcontroller 700.

Using color magnitude measurements as a function of drawer position as exemplified in the FIG. 13 graph, the microcontroller 700 can infer color tones of the wrapper or specific indicia (e.g., such as lettering or coded stripes on the wrapper) at each position of the spirals 320. Note that there are 15 peaks in the sample data provided (numbered above each peak in the FIG. 13 graph), one for each of the 15 penny rolls loaded into the corresponding inventory track 310. The microcontroller 700 can also determine the reflectivity of the surface of each of the change rolls 330, which is correlated to the diameter of the change rolls 330. From this data, it is possible to provide the operator an automatic count of the inventory as well as a verification that the inventory loaded is of substantially correct wrapper color and size. Whereas the automatic counting and verification using the prescribed method performs well with good condition standard color-coded wrappers, it is desirable to have a method of allowing the operator to override the automatic count should non-standard or poor condition roll wrappers be used in the inventory. After each drawer push, the user interface 110 alerts the operator to the automatic inventory count of each of the inventory tracks 310. If inventory does not appear to be the correct type due to failure for color or magnitude, the user interface 110 will ask the operator to repush the inventory drawer 300*a* or otherwise manually correct the count at the user interface 110. Additionally, it is preferrable to have the microcontroller 700 blink the indicator light above any of the inventory tracks 310 for which the inventory measurements are found invalid.

It is noted that although in the above description, loading inventory involves adding change rolls 330 to various inventory tracks 310 within the inventory drawers 300, it is also possible to remove inventory from those inventory drawers 300. The inventory scan when closing the inventory drawers 300 will report the actual rolls loaded in each position whether change rolls 330 or other inventory are added or removed.

When an operator wants to vend rolls of coin, the inventory door 103 is closed and locked. The operator navigates to a vend menu on user interface 110 and places an order for desired change rolls 330 from the available inventory. The order is transmitted from the main safe controller 400 to the dispense controller 430. Dispense controller 430 contains within its memory an awareness of where all inventory is located within the dispenser assembly 200. The dispense controller 430 sends commands to each of the appropriate motor boards 350 to begin vending the inventory using the serial communication bus. The corresponding inventory detection boards 210 meanwhile begin operation in a vend sense mode.

During vend sensing for the inventory drawer 300*a*, detector microcontroller 700 sends signals to the light emitters 212 to turn on all LED elements to a maximum brightness level, which in some embodiments is approximately 30 mA per LED. The result is bright white light from all four inventory track 310 positions. Microcontroller 700 then monitors the ADC channels of the visible light detectors 211 to monitor the approach and subsequent fall off of change rolls 300 as they are pushed underneath the light detectors 211 by the motor driven spirals 320. Using the corresponding light emitters 212 as bright illumination sources, it is possible to detect even the darkest of change rolls 330 sliding underneath the light detectors 211.

Figure 14A:
FIGS. 14A and 14B show representative waveforms of reflected signals from a product being dispensed and a derivative of the reflected signals of the product being dispensed, in accordance with an embodiment of the invention.
Figure 14B:
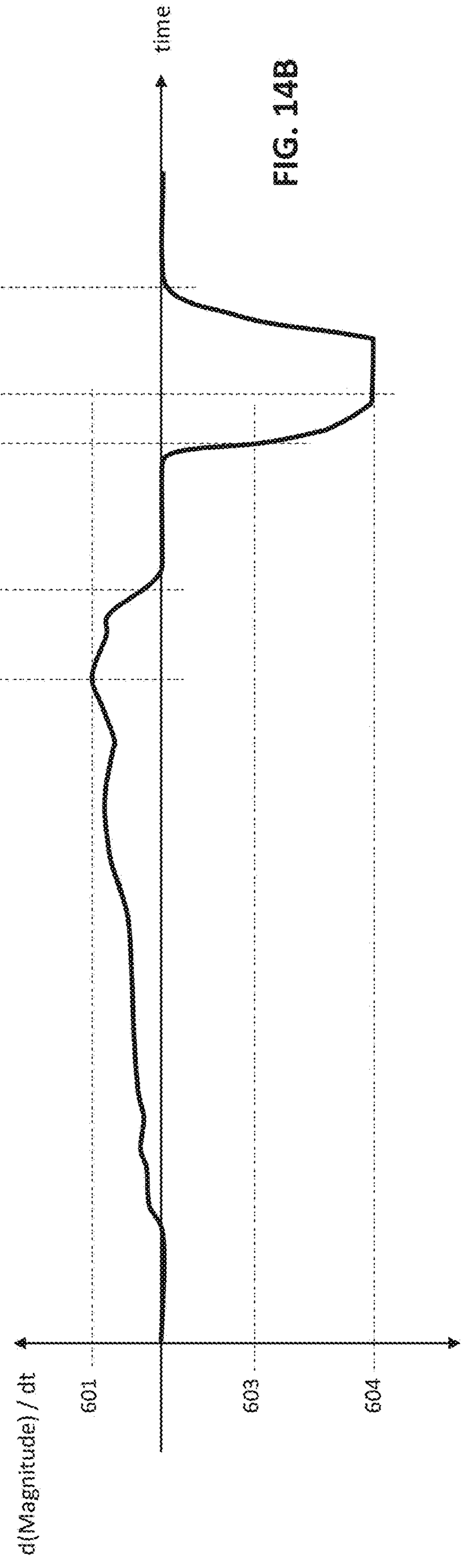

FIG. 14A illustrates the magnitude of the ADC measurement for one of the light detectors 211 (e.g., 211*a*) as function of time while a change roll 330 is vended from its corresponding one of the inventory tracks 310 of the inventory drawer 300*a*. At a first moment, 600, the front edge of a change roll 330 begins to reflect a bit of light from emitter 212*a* back at detector 211*a*. This marks the initial approach the coin inventory towards the drop zone. The first derivative of the magnitude versus time, seen in FIG. 14B, begins to climb positive indicating an upward slope of the magnitude with time. As the change roll continues to advance under detector 211*a*, the magnitude gets increasingly brighter until it reaches a maximum level 602. For many coin roll types, this maximum level may saturate the 12 bit ADC input range of 4096 at which point the derivative will approach zero. To determine if a change roll has properly vended, microcontroller 700 looks for a steeper downward falloff of magnitude corresponding to the change roll 330 rolling down ramp 311 of a corresponding inventory track 310 after it is released from its corresponding driven spiral 320. This imposes a requirement that the magnitude of the falling side gravity free rolling slope is larger than the magnitude of the rising side slope during powered spiral travel. Mathematically, that imposes the condition that the magnitude of the derivative function minimum 604 is greater than the magnitude of the derivative function maximum 601. Additionally, the microcontroller 700 ensures that the falling slope is at least at a minimum magnitude 603.

Microcontroller 700 sends a message to the motor driver board 350*a* at time 605 to stop driving the corresponding motor 340 once the derivative returns to approximately zero indicating the change roll 330 has left the sensing area and is therefore vended to drop zone 312. In this manner, it is possible to simultaneously vend from multiple track positions across multiple inventory drawers 300, with each monitoring its own vend sensors verifying success of each tracks' vend.

In the scenario that a change roll 330 is not vending properly due to a blockage, misalignment of the spiral 320, or mutilation of the change roll 330 itself, microcontroller 700 will fail to find the prescribed features within a timeout period, nominally 4.5 seconds or about twice the time it takes for a typical vend based on motor speed. A vend fault will be transmitted back to the dispense controller 430, which may then decide to decommission that inventory track 310 until the operator clears the jam during the next inventory load.

While the smart safe is closed, locked, and idle, microcontroller 700 periodically strobes the light emitters 212 and monitors light reflected into light detectors 211 to ensure reflected light remains constant. A deviation to the expected low magnitude of received light is indicative of an inventory fishing cheat where someone is compelling the change rolls 330 toward the drop zone of the safe 100 outside of the normal vend process. Such a detected tamper event is reported to the dispense controller 430, and then relayed to the main safe controller 400 where appropriate alerts can be issued. Periodic strobing is preferably every 5 seconds.

Figure 15:
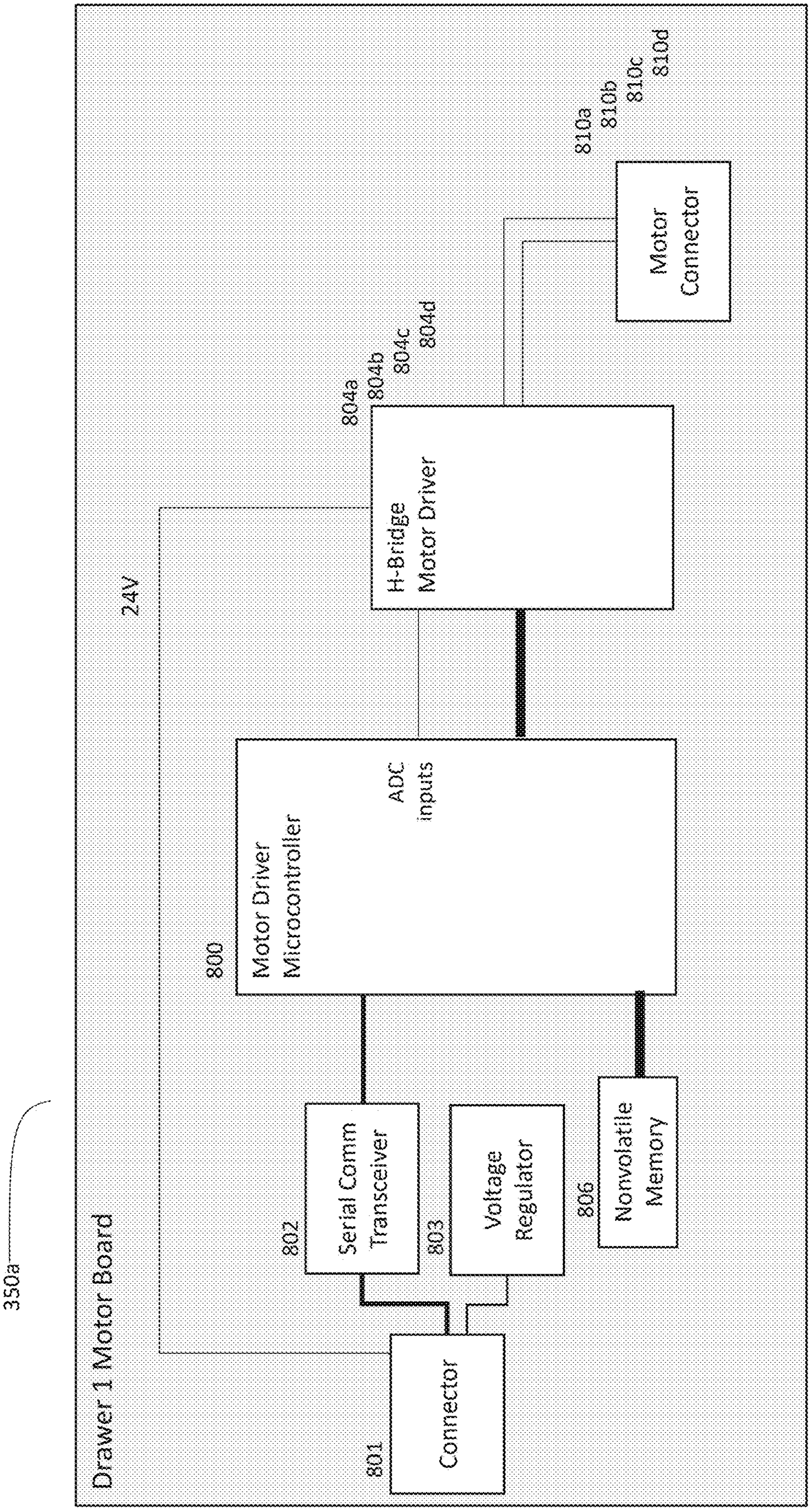
FIG. 15 shows a block diagram of electronics for a representative motor board, in accordance with an embodiment of the invention.

FIG. 15 shows a detailed view of the circuitry of motor board 350*a*. The motor boards 350*b* and 350*c* may have similar circuitry as that shown and described for motor board 350*a*. Motor driver microcontroller 800 is configured to receive commands to begin vending or stop vending using serial communication transceiver 802, preferably a CANbus transceiver. Microcontroller 800 commands H-Bridge motor drivers 804*a*, 804*b*, 804*c*, 804*d* (collectively, motor drivers 804) for each track position motor to run in a forward direction when commanded. Diagnostic outputs from the motor drivers 804 indicate back to the microcontroller 800 the current drawn from the motor or the presence of a motor fault (e.g., a missing or shorted motor) and is interpreted by the microcontroller 800's ADC inputs. The power for the motor drivers 804 is preferably 24 VDC that is controllably delivered to connector 801 when enabled by dispense controller 430. Since all signals and power received by connector 801 are delivered by a cable connected to pogo contact board 302, they are applied and removed each time the inventory drawer 300*a* is opened and closed making and breaking contact with the pogo array 250. It is therefore desirable to avoid having 24 VDC always on the pogo pins which may draw arcs of electricity and degrade the contacts. 24V is therefore preferably only enabled just prior to a vending operation, when the inventory drawers 300 are all in their closed position, firmly in contact with the pogo array 250. In this manner, no arcs are drawn. Power to microcontroller 800 is drawn from 5V DC supplied from connector 801 which is locally regulated down to 3.3V with voltage regulator 803.

Once the motor board 350*a* is instructed that a vend has completed from its associated inventory detection board 210*a*, it is desirable to reverse the motor drive for a fraction of a vend cycle in advance of the next operator vend order. Reverse motor drive time is preferably 0.25 s, or about ⅛ the typical vend cycle time. The advantage of a brief backward drive motion is to reduce the chance of having the next change roll 330 fall out unintentionally upon the next time the operator loads inventory, pulling the front-most roll further back from the drop zone 312. Another advantage is providing an easier to interpret vend sense signal for the next change roll 330 to vend ensuring a clearly detectable ramp up between points 600 and 602.

Figure 16:
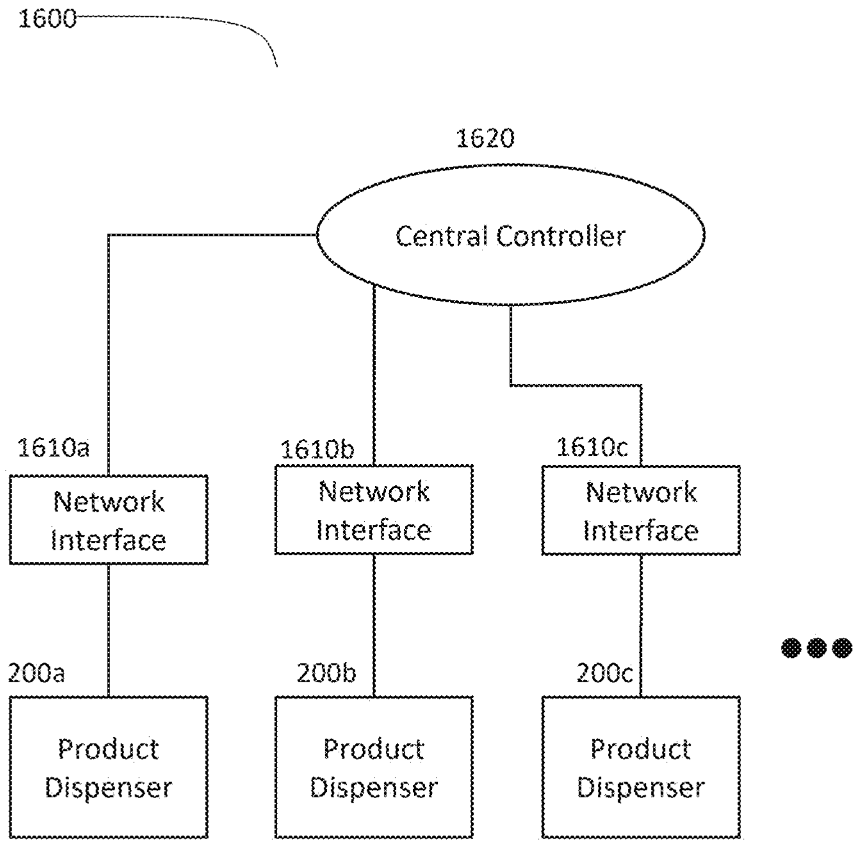
FIG. 16 shows an example of a dispenser product arrangement with a centralized controller that may be used to implement at least a portion of an item dispensing system, in accordance with an embodiment of the invention.

FIG. 16 shows an alternate controller arrangement, 1600, whereby a central controller 1620 is used to interpret and control one or more product dispensers, 200*a*, 200*b*, 200*c*, etc. to dispense and monitor their inventory. Each of the product dispensers 200*a*, 200*b*, 200*c*, etc. is connected to the central controller 1620 through a respective network interface 1610*a*, 1610*b*, 1610*c*, etc. The central controller, 1620, takes on the responsibilities of the dispense controller 430 (FIG. 4B). Central controller 1620 may be any form of processing unit configured to run programs stored in a memory structure and may be a microcontroller, microprocessor, application-specific integrated circuit (ASIC) with processing unit, field-programmable gate array (FPGA), a cloud server, or collection of linked cloud computing resources.

The embodiments described above are considered illustrative only, and should not be viewed as limited to any particular arrangement of features. For example, those skilled in the art will recognize that alternative processing operations and associated system configurations can be used in other embodiments. It is therefore possible that other embodiments may include additional or alternative types of item dispensing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. An item storage system comprising:

one or more inventory drawers, at least a given one of the one or more inventory drawers comprising one or more inventory tracks configured to hold one or more items;

at least a given one of the one or more inventory tracks comprising:

a sensor assembly affixed above a front of the given inventory track, the sensor assembly comprising at least one emitter and at least one sensor, the at least one sensor being configured to output one or more sensor signals proportional to a magnitude of light reflected from at least one of the one or more items in the given inventory track, a level of the one or more sensor signals changing in response to motion of said at least one of the one or more items in the given inventory track; and a controller configured to drive the at least one emitter and to receive the one or more sensor signals from the at least one sensor, wherein the controller:

drives the at least one emitter when loading the one or more items into the given inventory track to a color associated with a type of the one or more items loaded into the given inventory track;

determines an inventory measurement by detecting whether an item is in each of one or more positions of the given inventory track as the given inventory drawer is slid along a set of drawer tracks; and drives the at least one emitter to display an error pattern in response to determining that the inventory measurement is an invalid inventory measurement.

2. The item storage system of claim 1 wherein the one or more sensor signals are proportional to the magnitude of light reflected from a frontmost one of the one or more items at the front of the given inventory track proximate an item drop region of the item storage system.

3. The item storage system of claim 2 wherein the controller is configured to detect motion of the frontmost one of the one or more items at the front of the given inventory track based at least in part on determining whether a magnitude of a rate of change of the one or more sensor signals exceeds a designated threshold.

4. The item storage system of claim 1, wherein the at least one emitter is capable of emitting red, green and blue light.

5. The item storage system of claim 1, wherein the one or more items comprise at least one of: rolls of coins; and hollow tubes with rolled banknotes inside, wherein each roll of coins and hollow tube has a detectable indicium thereon.

6. The item storage system of claim 1 wherein the invalid inventory measurement corresponds to detecting one or more error conditions associated with the one or more items loaded into the given inventory track.

7. The item storage system of claim 6, wherein the one or more error conditions comprises at least one of: an incorrect item loaded into the given inventory track; and an unanticipated item loaded into the given inventory track.

8. An item storage system comprising:

one or more inventory drawers, at least a given one of the one or more inventory drawers comprising one or more inventory tracks configured to hold one or more items;

at least a given one of the one or more inventory tracks comprising:

a sensor assembly affixed above a front of the given inventory track, the sensor assembly comprising at least one emitter and at least one sensor, the at least one sensor being configured to output one or more sensor signals proportional to a magnitude of light reflected at least one of the one or more items in the given inventory track, a level of the one or more sensor signals changing in response to motion of said at least one of the one or more items in the given inventory track; and a controller configured:

to detect a position of the given inventory track in the given inventory drawer; and to drive the at least one emitter, based at least in part on the detected position of the given inventory track in the given inventory drawer, between (i) operation in accordance with an indicator function and (ii) operation in accordance with a scanning function;

wherein the at least one emitter, when driven by the controller to operate in accordance with the indicator function, is configured to display one or more error patterns.

9. The item storage system of claim 8 wherein responsive to detecting that the position of the given inventory track in the given inventory drawer is a closed position, the controller drives the at least one emitter to operate in accordance with utilizing the indicator function.

10. The item storage system of claim 9 wherein, when the controller drives the at least one emitter to operate in accordance with in the indicator function, the controller utilizes the one or more sensor signals to determine an inventory measurement for the given inventory track of the given inventory drawer.

11. The item storage system of claim 10 wherein, when the controller drives the at least one emitter to operate in accordance with in the indicator function, the controller drives the at least one emitter to display at least one of the one or more error patterns in response to determining that the inventory measurement is an invalid inventory measurement.

12. The item storage system of claim 11 wherein the invalid inventory measurement corresponds to detecting one or more error conditions associated with the one or more items loaded into the given inventory track.

13. The item storage system of claim 12, wherein the one or more error conditions comprises at least one of an incorrect item loaded into the given inventory track and an unanticipated item loaded into the given inventory track.

14. The item storage system of claim 9 wherein, when the controller drives the at least one emitter to operate in accordance with in the indicator function, the controller utilizes the one or more sensor signals to detect a type of the one or more items loaded into the given inventory track and drives the at least one emitter to output a preconfigured color associated with the type of the one or more items loaded into the given inventory track.

15. The item storage system of claim 9 wherein, when the controller drives the at least one emitter to operate in accordance with in the indicator function, the controller utilizes the one or more sensor signals to detect a quantity of the one or more items loaded into the given inventory track and drives the at least one emitter to output a pattern associated with the quantity of the one or more items loaded into the given inventory track.

16. The item storage system of claim 8 wherein responsive to detecting that the position of the given inventory track in the given inventory drawer is an opened position, the controller drives the at least one emitter to operate in accordance with the scanning function.

17. The item storage system of claim 16 wherein, when the controller drives the at least one emitter to operate in accordance with the scanning function, the controller drives the at least one emitter to strobe across two or more colors in succession and detects a magnitude of the one or more sensor signals for each of the two or more colors to detect a type of the one or more items loaded into the given inventory track.

18. The item storage system of claim 17 wherein the two or more colors comprise at least red, green and blue.

19. The item storage system of claim 17 wherein, when the controller drives the at least one emitter to operate in accordance with the scanning function, the controller drives the at least one emitter to strobe across the two or more colors in succession multiple times per second.

20. The item storage system of claim 17 wherein detecting the type of the one or more items loaded into the given inventory track is further based at least in part on monitoring a reflectivity of surfaces of the one or more items loaded into the given inventory track.

* * * * *